(12) United States Patent
Imbrie

(10) Patent No.: US 7,585,132 B2
(45) Date of Patent: Sep. 8, 2009

(54) METHOD FOR REMEDIATING A CONTAMINATED SITE

(75) Inventor: James Imbrie, 3613 W. Brittany Ct., Mequon, WI (US) 53092

(73) Assignee: James Imbrie, Mequon, WI (US)

( * ) Notice: Subject to any disclaimer, the term of this patent is extended or adjusted under 35 U.S.C. 154(b) by 71 days.

(21) Appl. No.: 11/603,401

(22) Filed: Nov. 22, 2006

(65) Prior Publication Data
US 2007/0297858 A1 Dec. 27, 2007

Related U.S. Application Data

(60) Provisional application No. 60/816,917, filed on Jun. 27, 2006.

(51) Int. Cl.
*B08C 1/00* (2006.01)
(52) U.S. Cl. .................. 405/128.75; 210/747; 588/320
(58) Field of Classification Search ................. 588/315, 588/320; 405/128.75, 128.5; 210/747
See application file for complete search history.

(56) References Cited

U.S. PATENT DOCUMENTS

| | | | |
|---|---|---|---|
| 5,514,279 A | 5/1996 | Blowes et al. | |
| 5,570,973 A | 11/1996 | Hunt | |
| 5,728,302 A * | 3/1998 | Connor et al. | 210/679 |
| 5,733,067 A | 3/1998 | Hunt et al. | |
| 5,789,649 A | 8/1998 | Batchelor et al. | |
| 5,944,446 A * | 8/1999 | Hocking | 405/129.4 |
| 5,975,798 A | 11/1999 | Liskowitz et al. | |
| 6,012,517 A * | 1/2000 | Schuring et al. | 166/53 |
| 6,337,019 B1 | 1/2002 | Razavi-Shirazi | |
| 6,596,190 B1 * | 7/2003 | Igawa et al. | 252/188.1 |
| 6,787,034 B2 | 9/2004 | Noland et al. | |
| 6,923,596 B2 | 8/2005 | Lessard | |
| 6,994,792 B2 | 2/2006 | Schlegel | |
| 2004/0165956 A1 * | 8/2004 | Greenberg | 405/128.75 |

OTHER PUBLICATIONS

Hans Peterson; "Removing Particles and Colour From Dugout Water"; Prairie Water News; Spring 1996; Article 8; vol. 6, No. 1; Saskatchewan Research Council; Saskatoon, Canada.

* cited by examiner

*Primary Examiner*—John Kreck

(57) ABSTRACT

A method of amending an aquifer having at least one contaminant comprising the steps of: mixing a sorbent material with a carrier to form a slurry, the sorbent material having one dimension of at least 1 micron; and introducing the slurry into the aquifer in a dispersed fashion within a pore space of the aquifer to promote permanent attenuation of the aquifer.

45 Claims, 4 Drawing Sheets

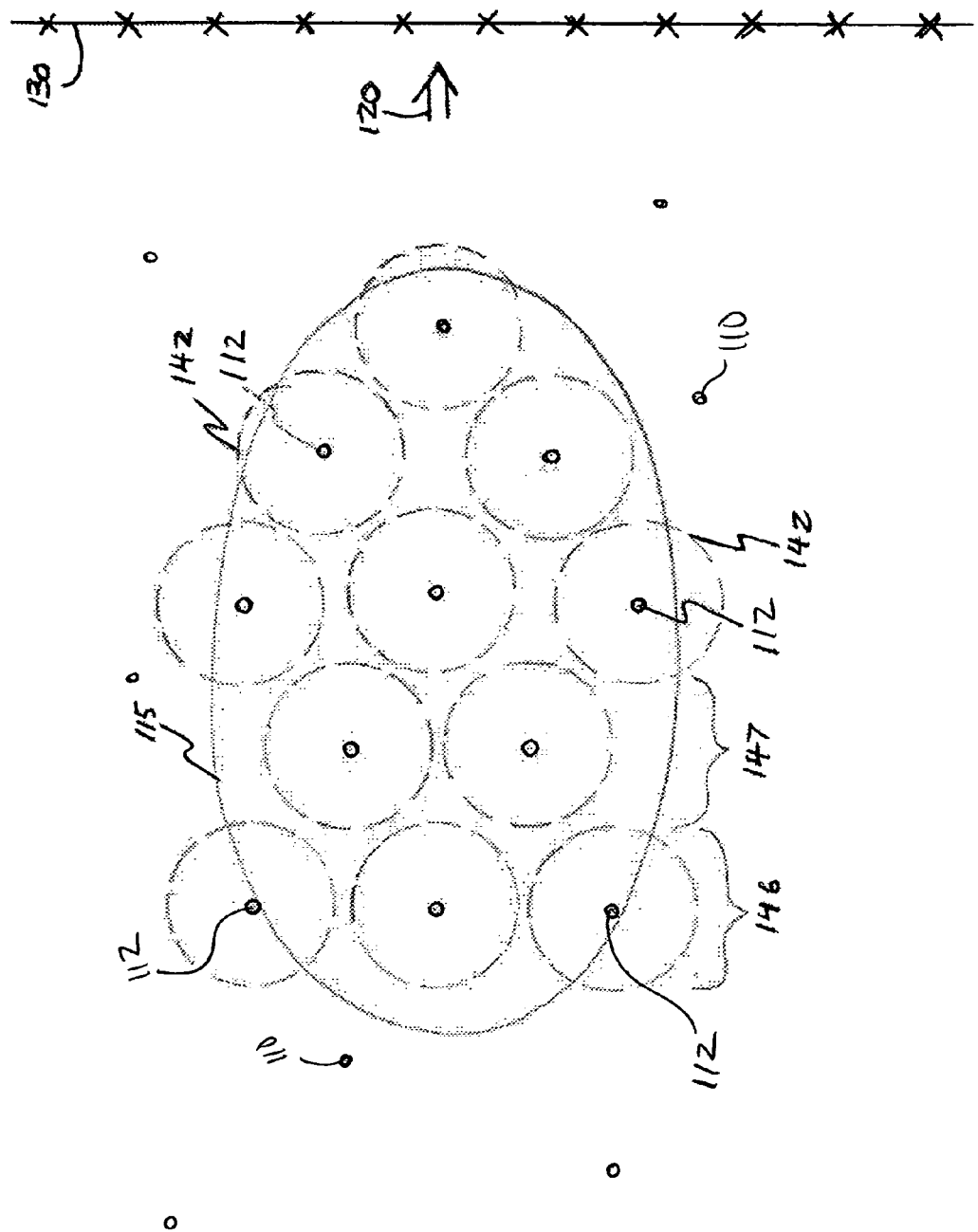

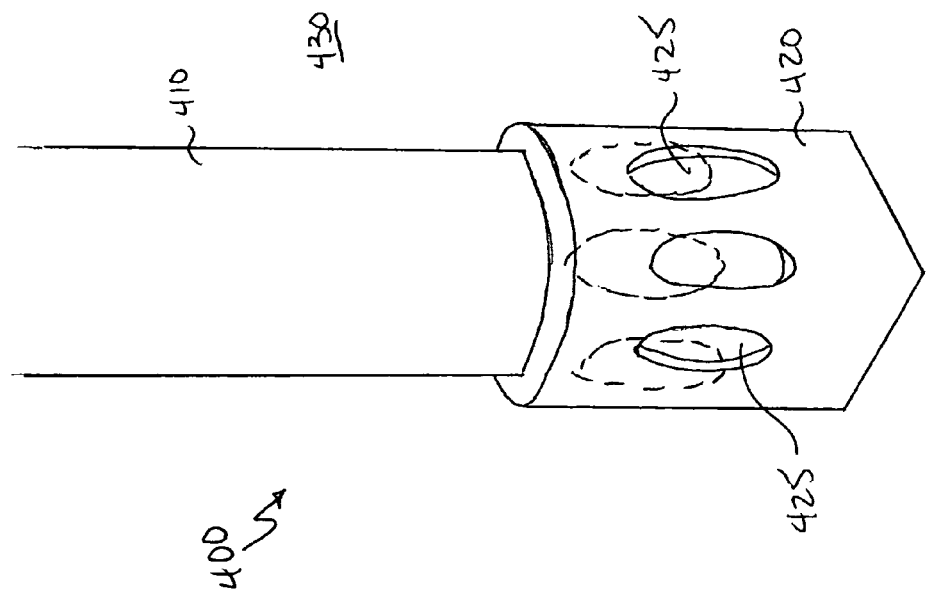
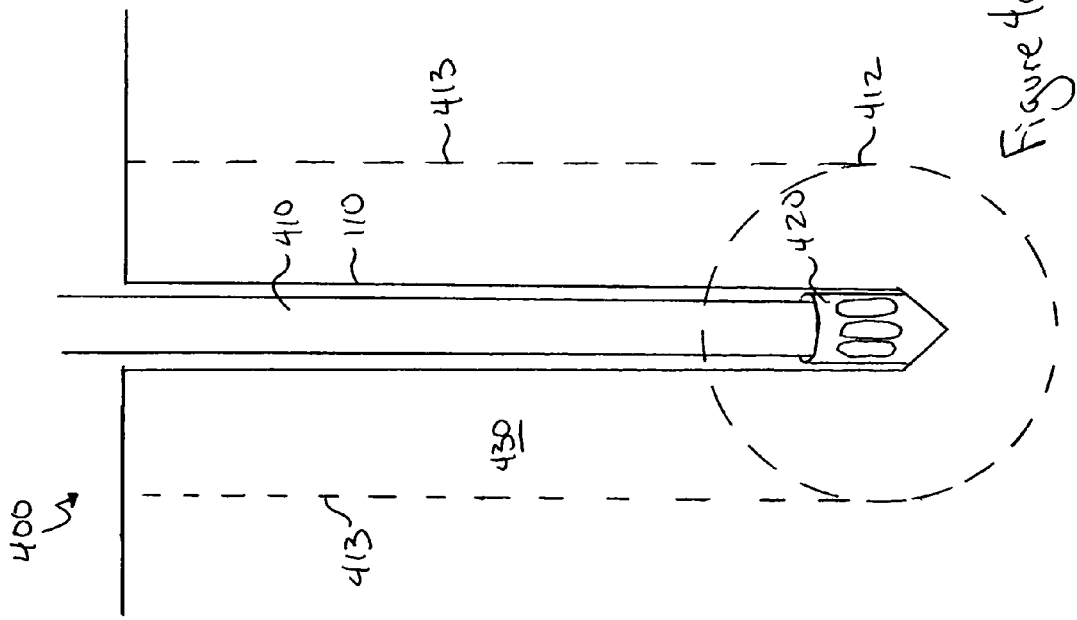
Figure 4b
Figure 4a

METHOD FOR REMEDIATING A CONTAMINATED SITE

CROSS-REFERENCE TO RELATED APPLICATIONS

This application claims priority to U.S. provisional patent application Ser. No. 60/816,917, filed on Jun. 27, 2006, incorporated herein in its entirety.

FIELD OF INVENTION

This invention relates generally to the field of remediation of a contaminated site, and in particular to the field of injecting a sorbent material suspended within a carrier into the pore space existing within contaminated media at a contaminated site to treat the contaminant.

BACKGROUND

Soil contamination is common in the United States. Once the soil becomes contaminated, precipitation may infiltrate though the soil and carry contaminants downward into groundwater. Because groundwater is the primary source of drinking water for about fifty percent (50%) of the population of the United States and contaminants may negatively affect human health and the environment, mitigation of contaminants in the subsurface is important.

Contaminants may be categorized as volatile organic compounds (VOCs), semivolatile organic compounds (SVOCs), fuels, inorganics (including radioactive substances), or explosives. The physical properties of these contaminants dictate the processes that may be effective in their treatment. For example, the nature of the contaminant structure will help determine how biodegradable a contaminant may be. More polar (and more soluble) molecules tend to be more readily biodegradable. Higher molecular weight molecules tend to be more difficult to degrade. Fewer chlorine atoms make a molecule easier to degrade, and a high degree of branching make a molecule harder to degrade. Physical properties such as a contaminant's octanol water coefficient (Kow), for an organic compound, will give an indication of the contaminant's mobility in an aquifer and its adsorption potential.

Over the years, a number of techniques have been developed to address subsurface contamination including groundwater pump and treat systems (P&T), air sparging (AS) systems, permeable reactive barriers (PRBs), chemical oxidation (ChemOx), and in-situ biological treatment systems (IBT). The remedial approach selected at any given site varies depending on the contaminants, their distribution, site conditions, and the treatment objectives. As with any remediation approach, selected treatment systems have their advantages and disadvantages. However, beyond the application issues, these systems often have limited effectiveness, and after implementation, residual contamination may remain at a site for decades or longer.

A number of factors can limit the accessibility of contaminants for treatment. Contaminants in an aquifer partition and equilibrate between the soil, aqueous, and nonaqueous liquid (or pure contaminant) phases. Following distribution and equilibration, attempts to remove contaminants are often hindered by the typically slow kinetics of desorption. Also, many organic compounds such as naphthalene have low solubilities and an affinity for the organic matter in the soil. In many cases these contaminants have more mass in the soil phase then in the aqueous phase. In addition, contaminants may migrate by diffusion into tighter portions of the soil fraction and be less easily removed with groundwater or addressed through the liquid phase.

A result of limiting site conditions and processes is that technologies such as P&T are often ineffective. Other technologies, such as ChemOx, may be cost effective for treatment of source areas, but are typically too costly to apply widely at sites and due to the limitations above often leaves residual contamination. Many other processes, such as air sparging, also have limited effectiveness due to aquifer properties and conditions that limit biological degradation of contaminants. PRBs can take extended periods of time to clean up at a contamination site because they rely on the slow leaching of contaminants from the solid to liquid phase and then treat the liquid phase contamination before it migrates off-site. This can result in unreasonably long time frames for site cleanup, as well as long term operation and maintenance costs.

Monitored natural attenuation (MNA) is a widely accepted remedial option for site closure that relies on sorption and naturally occurring biodegradation to attenuate contaminants. Application of MNA typically involves source control to remove "hot spots" of contamination followed by monitoring the site to demonstrate that the contaminant plume is stable or shrinking. However, MNA has its limits. Both the biodegradation and sorption component of the remedy may not be supported by conditions in the aquifer. In some instances, natural degradation of contaminants may be limited due to unfavorable environments for growth. In other cases, subsurface soils may have a very low organic content, measured in fractions of percents, and as a result, contaminant migration is not slowed significantly by the sorption reaction. If these limiting conditions could be corrected, the natural degradation rate would increase and there would be more time for natural degradation to reduce contaminant levels. This would significantly enhance the overall subsurface environment for remediation, make MNA more widely applicable, and other remedial options significantly more effective.

What is needed are treatment technologies that more effectively addresses contaminants in an aquifer formation by resolving at least some of the limiting conditions in aquifers. Such a system could also be used to enhance the performance of a variety of treatment systems. The present invention offers such a solution, by treating contaminants in an aquifer by modifying aquifer properties and making them more favorable for contaminant treatment.

Adsorbent materials have unique properties that allow them, once emplaced, to treat contaminants and enhance aquifer properties for treatment generally. Sorbent materials, such as activated carbon (AC) for example, have a very high sorption capacity due to their very large surface area and numerous and variable pore sizes. These properties allow such materials to sorb significant quantities of a wide variety of contaminants. It is also known that microorganisms find activated carbon to be a very favorable environment on which to grow. Emplacing materials like activated carbon in a dispersed fashion within a contaminated medium, like an aquifer, with nutrients and/or electron acceptors/donors if necessary, would provide exceptionally favorable conditions for contaminant treatment. Sorption would attract and accumulate contaminants on the carbon, where microbes could then grow and degrade the adsorbed contaminants. Activated carbon would also, by increasing the sorption reaction, significantly slow the migration or movement of the contaminant in the aquifer. Activated carbon amendment alone could slow or stop the migration of contaminants off site, make MNA more widely applicable, and make remediation using almost any treatment technology, implemented in concert with activated carbon, more effective. AC is also considered an inert (i.e., a stable material that is not dissolved by its intended reaction with a contaminant in the subsurface) and non-biodegradable substance. As such, by selecting an appropriately sized AC particle, it can be permanently introduced into an aquifer, as discussed in greater detail infra.

Activated carbon is typically manufactured in a process that involves dehydration and carbonization followed by activation. The primary result of this process is a material of primary carbon. Burning off decomposition products to expose pores allows for subsequent widening and development of pores during activation. Some coal based carbons are converted to a fine powder prior to processing into activated carbon. By necessity, the carbon is reconstituted using a binder. Other composite particles of carbon and other materials will also contain a binder. The binder, while typically stable may not be as stable or provide as strong a bond as carbon made without a binder. Failure of the binder, while unlikely, may result in the release of very fine particles that may migrate with the contaminant attached. Activated carbon without binders is essentially elemental carbon and ash, and as such is inert, and stable. It is the object of the instant invention to emplace the carbon as permanently as practicable, as such activated carbon without binders is preferred. If activated carbon with binders is used, the conditions of use and permanence of the binders should be considered. Those practiced in the art will appreciate that different types of activated carbons are available. Carbons may be classified as H-type (hydrophobic), or L-type (hydrophyllic). The hydrophobic/hydrophyllic properties result from the different processes used to manufacture each carbon type. The H-type carbon is generally preferred for permanent emplacement, as the carbon will not migrate under typical aquifer conditions. The L-type carbons are generally preferred for injection/extraction as they will tend to move more readily with injected and extracted water. In addition, the pore space of the activated carbon can be matched to the size of the contaminant being absorbed, as discussed in greater detail infra.

As used herein, "adsorption" is defined as the two dimensional accumulation of one or more contaminants on the internal and external surface of a solid, whether adsorbed permanently or reversibly, where the adsorbed compound or substance partitions between the solid and liquid phases in an equilibrium reaction; "absorption" is defined as taking one or more contaminants into the three dimensional volume of the solid through or as through pores or interstices, and allows for diffusion to internal sites of the solid. It is believed that the three dimensional absorption, which includes diffusion, may be the cause of sometimes slow equilibration and desorption times; "sorption" and "sorb" are defined as the process in which one substance (sorbent) takes up, accumulates, or holds another by either absorption or adsorption; "sorbent material" is defined as any substance or a variety of substances that have the ability to attract and accumulate various contaminants at their surface and/or within the substance(s) through sorption, and/or are sorbent relative to the contaminant; "activated carbon" is defined as a solid substance that is very porous, has a large surface area, and is produced from a wide variety of organic materials with a high carbon content including but not limited to wood, coal, peat, lignin, nut shells, bamboo, bagasse (sugar cane pulp), sawdust, corn cob, lignite, bone and petroleum residues. These precursors are manufactured into activated carbon by a process of dehydration, carbonization, and activation. Activated carbon may be powdered, granular, extruded, or a composite of different materials such as iron and carbon, affixed to other materials, reconstituted into pellets or cylinders, or may be activated carbon fibers (ACFs) with activated coating on glass fibers not limited to rayon, acrylic, polyvinyl alcohol, polymers such as cellulose or polyacrylicnitrile, and phenolic materials. Activated carbon is characterized by a high surface area, typically ranging from about five hundred square meters per gram ($500 \text{ m}^2/\text{g}$) to about one thousand seven hundred square meters per gram($1,700 \text{ m}^2/\text{g}$) but can range up to about two thousand five hundred square meters per gram ($2,500 \text{ m}^2/\text{g}$), a highly porous structure, and the ability to absorb, accumulate, and concentrate large quantities of organic molecules and inorganic molecules. Activated carbon may also act as a catalyst in oxidizing or other reactions, or a support for catalysts such as precious metals catalysts. Activated carbon may range in size from the micron range up to larger than ten (10) millimeters; "treat," "treating," and "treatment" are defined as sorbing a contaminant onto or within a sorbent so that the contaminant can be reduced, naturally broken down (i.e., biological degradation), transformed, and/or slowed from migrating at or beyond a contaminated site so that the release of the contaminant from the site is often so slight so as to be below governmentally set regulatory levels, criterion, or treatment goals; "attenuation" refers to the process by which a compound is reduced in concentration over time, through absorption, adsorption, degradation, dilution, and/or transformation, either alone or in combination, and includes reducing the migration rate of one or more contaminants within a contaminated site to allow natural degradation to occur; an "aquifer" is defined as any subsurface soil bearing water; a "contaminant" is defined as any organic chemical substance or substances that may be toxic or have otherwise adverse effects on human health and/or the environment, and may be present above regulatory criteria, and includes chemicals such as volatile organic compounds (VOCs), a broad group of halogenated and nohalogenated compounds that are volatile, semivolatile organic compounds (SVOCs) a broad group of halogenated, nohalogenated, polycyclic aromatic hydrocarbon, pesticide, dioxin and furan, and polychlorinated biphenyl compounds that are semi volatile, fuels or petroleum products such as gasoline, diesel, and jet fuels and their constituent compounds, typically found in soil and groundwater or other media at contaminated sites; "injection point" refers to borings, injection rods, wells (vertical and horizontal), infiltration galleries, or any other subsurface interface, or any other means which is/are used to emplace or introduce the sorbent material and carrier into the contaminated medium in a dispersed fashion, whether created for testing the contaminated site or another purpose, or created expressly for the purpose of practicing the instant invention; an "injection" is defined as introducing a slurry consisting of sorbent material and a carrier into the subsurface; a "carrier" is defined as water, guar gum, air, nitrogen, gases, aerosols, or other amendments such as coagulants, polymers, polyelectrolytes, hydrogen release compounds and substances (HCs, which are more applicable to chlorinated compounds, including lactate and lactic acids) or oxygen release compounds and substances (OCs, which are more applicable to aromatics and hydrocarbons, including slow release peroxides), chemical oxidants (Fentons, modified Fentons, potassium permanganate, permanganates, ozone, peroxides, hydrogen peroxide, etc.), mixes thereof, and other liquids or substances that may be used to make a slurry with the sorbent material to facilitate introducing and dispersing the sorbent material into the contaminated media, adequately keep the sorbent material suspended and flowable so that it may be injected into or emplaced in the subsurface or contaminated media, and/or help stabilize the sorbent material in place; "coating(s)" are defined as microencapsulations, nanoencapsulations, coatings, timed release coatings, and controlled release coatings including but not limited to surfactants (sometimes sugar based), natural polymers (including but not limited to starches and cellulose), proteins (including but not limited to soy, corn, gelatin, collagen, polyglutamic acid, casein, and chitosan), vegetable gums (including but not limited to gum Arabic, guar, locust bean, pectin), natural minerals (including but not limited to clays), sulfur, waxes, and synthetic polymers; "amendments" are defined as nutrients, micro nutrients, co-substrates, electron donors, electron acceptors, microorganisms, bacteria, yeast, enzymes, HC, OC, lactate, surfactants, molasses, guar gum, food grade oils, ethanol, acetate, gases, methane, oxygen, nitrogen, hydrogen, ozone, aerosols, hydrogen peroxide, materials that cause oxygen to be released from aquifer materials, buffers, acids (such as phosphoric acid), bases, lime, phosphates, ammonia, nitrogen species such as nitrate, minerals, with the above substances sometimes coated for timed release or microencapsulated, or other substances, and mixes thereof added to the sorbent material or sorbent material slurry to enhance contaminant removal and treatment of the contaminated site; "contaminated media" refers to soil, groundwater, sediment, or sludge that contain contaminants; "permanent" does not mean ad infinitum, but refers to long-lasting without significant change, not subject to erosion, and/or intended to exist for a long, indefinite period of time without regard to unforeseeable conditions, i.e., stable; and "treatment goals" refers to contaminant treatment goals, requirements, criteria, or objectives established by statute, code, or regulation, or by agreement with regulatory authorities.

SUMMARY

It is one object of at least one embodiment of the present invention to provide a method to sorb and/or biologically degrade contaminants in soil, groundwater, sludge, sediment, or migrating contaminated vapor in subsurface soil by distributing an effective amount of sorbent material(s) and/or amendments, in a dispersed fashion within the contaminated media, to sorb one or more contaminants and stimulate biological degradation of contaminants that results, to the extent practicable, in meeting soil, groundwater, sludge, sediment, and soil air treatment goals.

It is a further object of at least one embodiment of the present invention to provide a method to oxidize/reduce, sorb, and/or biologically degrade contaminants in soil, groundwater, sludge, and sediment by combining, or combining temporally or spatially, ChemOx, ozone, air sparging, oxygen and hydrogen release materials, bio-enhancements, and amendments with effective amounts of sorbent materials, distributed in a dispersed fashion within the contaminated soil, groundwater, sludge, and sediment, to treat, attenuate, oxidize/reduce, sorb, and/or stimulate biological degradation that results, to the extent practicable, in meeting soil, groundwater, sludge, and sediment treatment goals.

It is a further object of at least one embodiment of the present invention to provide a method to inject sorbent materials, sometimes with other biologically, chemically, or physically active material, distributed in a dispersed fashion within an aquifer matrix. The sorbent material, typically activated carbon, composite particles made of activated carbon combined with other materials, then acts to sorb, accumulate, and/or concentrate contaminants on its surface from the surrounding aquifer (or other contaminated media) and retard the movement of the contaminant(s) in the aquifer, and/or hold the contaminant(s) to the sorbent material where the contaminant(s) is/are either held and/or degraded through biological activity or other chemical reactions or treatment, or re-released(desorbed) and further degraded and attenuated by naturally occurring processes in the surrounding aquifer (or other staged process(es)). The sorbent material may also be placed temporarily in the aquifer (or other contaminated media) using injection, for example, and extracted (or separated) after a period of time, with the (sorbed) contaminant(s) attached to the sorbent material, for further treatment and disposal. The sorbent material may be introduced in-situ or the contaminated soil may be removed before treatment according to the instant invention. The treated soil can then be re-introduced back in to the same location from which it was removed. The sorbent material may also be introduced into a site or at a location prior to any contaminants being detected or known as a preemptive step in the event a contaminant is ultimately released at the site.

The sorbent material may be combined with water and/or other carriers to form a slurry and injected into the contaminated portions of the aquifer (or other contaminated media), as a slurry, through direct push rods, injection points, wells, infiltration galleries, or other means of mixing or placing the sorbent materials in with the aquifer providing that they allow for the dispersed placement of the sorbent material, in the desired location, and at the desired quantity. In some instances the introduction of aerosols, air, or another gas during or after liquid slurry pumping and/or placement, or using a gas or aerosol by itself may be beneficial to the dispersed placement of the sorbent material.

The sorption process includes contaminants being partitioned from the aqueous phase and concentrated on the surface of the solid carbon phase (or other sorbent material), and can result from two properties, the high affinity of the contaminant for the carbon and the low solubility of the contaminant. The affinity of the contaminant for the carbon results from a variety of attractive forces, where one force may be dominant. Interactions between the dipole moments of sorbate and sorbent molecules are the primary mechanisms underlying sorption. There are three categories of adsorption forces, chemical, electrostatic, and physical. Chemical sorption refers to sorption caused by covalent and hydrogen bonding of the solute to the sorbent; electrostatic sorption results from the attraction of charged molecules to the charged surface of the sorbent through ion-ion and ion-dipole forces; and physical sorption is a result of Van der Waals forces which consist of London dispersion forces and hydrophobic bonding. London forces are caused by rapidly fluctuating dipole and quadrupole moments resulting from the movement of electrons in their orbitals. Hydrophobic bonding is a result of thermodynamic gradients caused by the repulsion of the sorbate from solution to the sorbent. The sorbent-solute interactions are preferred to the solute-water interactions. Physical sorption Van der Waals forces are thought to predominate sorption of volatile organic compounds (VOCs).

Several factors that may influence sorption by activated carbon include the nature of the carbon, the properties of the molecule to be sorbed, including size and polarity, and the properties (water chemistry) of the solution, including its pH.

There are generally three steps involved in sorption of contaminants: the transport of the solute through a surface film to the exterior of the carbon, the adsorption of the solute on the interior surfaces on the carbon pores and capillary surfaces of the carbon, and the diffusion of the solute within the carbon. The strongest sorption takes place when the sorbed molecules barely fit into the carbon pores, thus the attracting forces are greatest if the pores match the molecule to be removed. Sorption is typically modeled using three isotherms, although other models may be used. Each isotherm and its assumptions follow:

Linear, where $S=K_dC$ assumes sorption not limited by number of sites;

Fruendlich, where $S=KC^n$; assumes sorption not limited by number of sites and

Langmuir where $S=(KQ_0C)/(1+KC)$ assumes a finite number of sorption sites. Isotherms also generally assume all sites equivalent, and no interaction between sites.

Other isotherms or partitioning models may also model contaminant distribution; these are just nonexclusive examples.

By virtue of its high surface area and pore structure, activated carbon has the ability to adsorb a high proportion of contaminants relative to other materials. Carbon also tends to be a preferred location for microorganisms to grow, so much so, that in other applications, carbon is impregnated with silver in an attempt to stop such growth, and issues with the generation of hydrogen sulfide (HS).

It should be understood, however, that the objects provided supra are not intended to be limiting, and that each embodiment of the instant invention need not satisfy each object. Rather, the method may be practiced in various forms, whether or not the objects are satisfied.

BRIEF DESCRIPTION OF THE FIGURES

FIG. 2 shows a top perspective view of a remediation site in which injection points are placed in alternate locations at the site to prevent the contaminant from migrating.

FIG. 4a shows a side view of one embodiment of a rod assembly used to introduce a slurry into an injection point at a contaminated site.

FIG. 4b shows a close up side view of one embodiment of a nozzle for introducing the slurry in a dispersed fashion into the ground of a contaminated site.

DETAILED DESCRIPTION OF EMBODIMENTS OF THE INVENTION

For the purpose of promoting an understanding of the present invention, references are made in the text hereof to embodiments of a method for treating a contaminated site. It should nevertheless be understood that no limitations on the scope of the invention are thereby intended. One of ordinary skill in the art will readily appreciate that modifications do not depart from the spirit and scope of the present invention. Some of these possible modifications are mentioned in the following description. Therefore, specific details disclosed herein are not to be interpreted as limiting, but rather as a basis for the claims and as a representative basis for teaching one skilled in the art to employ the present invention in virtually any appropriately detailed system, structure, or manner.

Moreover, the term "substantially" or "approximately" as used herein may be applied to modify any quantitative representation that could permissibly vary without resulting in a change in the basic function to which it is related, and approximately means about or roughly rather than an accurate quantification.

To practice a method according to the present invention, the properties of the aquifer formation, including but not limited to aquifer formation hydrogeologic properties, groundwater surface and variability thereof, groundwater gradient, groundwater flow rate, groundwater velocity, soil permeability, aquifer hydraulic conductivity), and geologic characteristics (soil stratigraphy, soil lithology, soil type(s)), aquifer injection properties (aquifer permeability, soil grain size distribution, soil porosity (total and effective), soil average void size, slurry bleed off rate), groundwater characteristics (gradient, flow rate, velocity, water surface elevation), water quality characteristics (total organic carbon, pH, hardness, dissolved solids, total iron, dissolved iron), soil characteristics (not limited to grain size distribution, soil type, total organic carbon, cation exchange capacity), contaminant(s), contaminant(s) quantity, extent, and properties) are first identified. One or more appropriate sorbent materials are then injected or otherwise applied or dispersed into the aquifer matrix. The sorbent material will actively sorb and transform the contaminants and either treat the contaminants or be extracted for further treatment and disposal. The adsorbtion material may contain amendments such as nutrients and microorganisms or be injected concurrently with the amendments.

Figure 1:
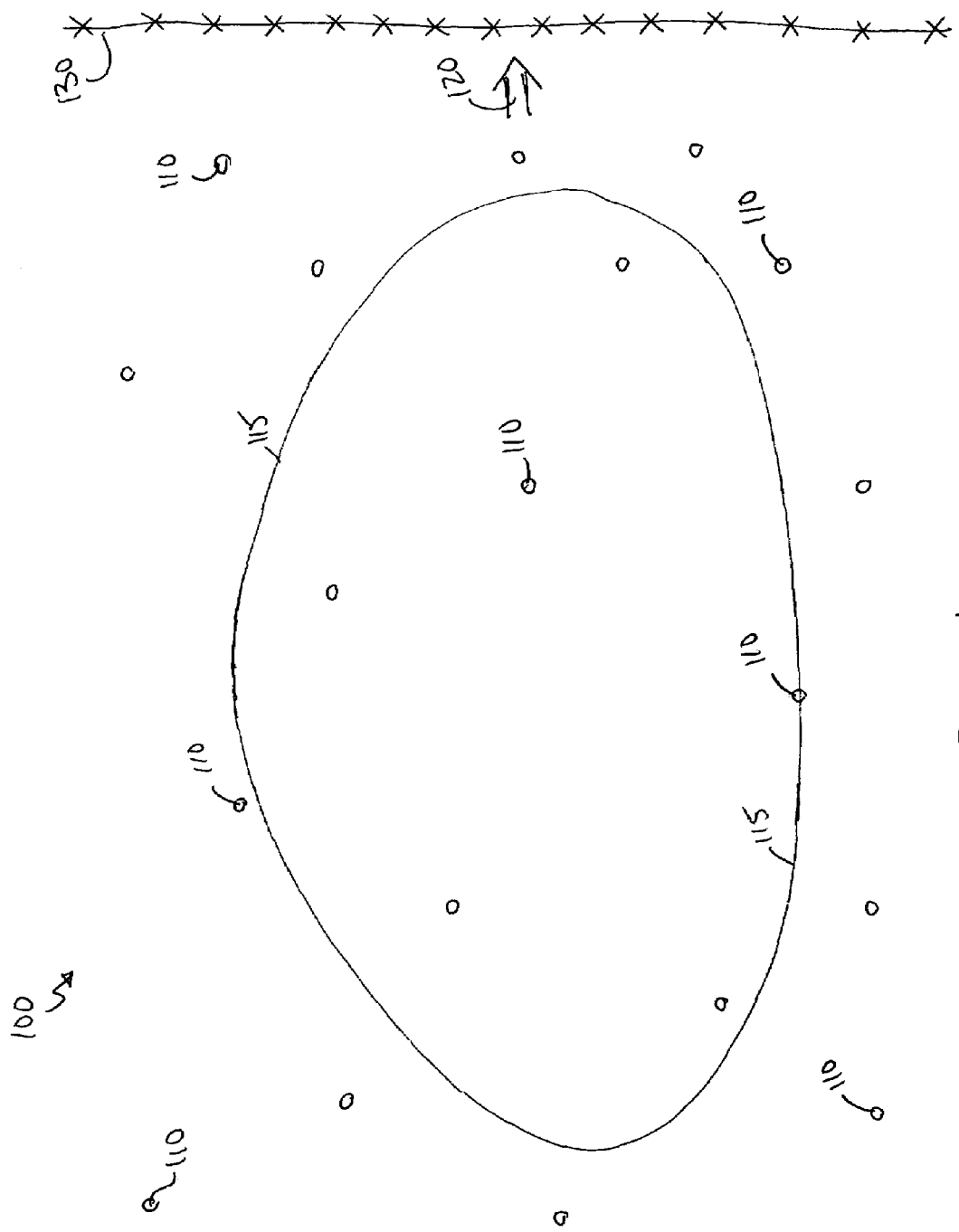
FIG. 1 shows a top view of an exemplary contaminated site and a grid of investigation points advanced to determine the extent of contamination.

FIG. 1 shows a top view of an exemplary contaminated site and a grid 100 of investigation points 110 used to determine the extent and nature of contamination. In the embodiment shown in FIG. 2, injection points 140 are created by injection rods, wells, infiltration galleries, another subsurface interface, or any other means used to emplace or introduce the sorbent material and carrier into the contaminated site in a dispersed fashion, whether naturally occurring, created expressly for the purpose of practicing the instant invention, or created for another purpose, but as provided in supra, could alternately be borings or wells made for the purpose of testing the contaminated site. Grid 100 can be of any pattern, or positioned randomly. However, grid 100 allows for a good approximation of the extent of the contamination. In the embodiment shown, investigation points 110 are advanced and wells installed, and soil and water samples collected at varying depths of each to determine whether contamination exists at any particular point. Thus, contaminant periphery line 115 can be determined. Also visible are site boundary line 130 and arrow 120 which indicates the general direction of the flow of groundwater and the contamination contained therein.

The injected sorbent material may be placed in portions of the contaminated media (for example, an aquifer) requiring treatment. In one embodiment of the invention, the injections may be in various grid patterns (of different off-sets) targeting the area(s) of concern in an aquifer, and the sorbent material is allowed to remain in place until treatment is completed, or longer, or permanently. In another embodiment of the invention, the sorbent material is allowed to remain in place until it has sorbed the contaminant. Then microorganisms that can degrade the sorbent material degrade both the sorbent material and the contaminant thereon. In another embodiment of the invention, sorbent material is injected and extracted in a variety of methods from push-pull injection extraction at specific injection points to sorbent material sweeps of the contaminated zone from injection points, wells, infiltration galleries, and/or French drain type systems. Deep tilling, hydraulic injection or multi-phase inert gas (such as nitrogen)/water injection, aerosol injection, and other injection methods well known to those of ordinary skill in the art, including combinations thereof, can also be used to inject and/or extract, or inject and distribute sorbent material into the contaminated media or aquifer.

Referring again to FIG. 1, each investigation point 110 is advanced and repeatedly tested, using a field screen with a photo ionization detector (PID) such as an Hnu, or a flame ionization detector (FID), as just two (2) examples. By advancing each investigation point 110 to various depths and collecting samples, the vertical extent of contamination can be detected. Both soil and groundwater are sampled over the vertical extent and typically beyond the depth at which the contaminant(s) is/are detected. The borings and wells are extended horizontally as well to identify the horizontal extent of contamination. The locations may not be uniformly distributed, but may vary in location based on screening and testing and contaminant distribution. This provides a three-dimensional model of contaminant distribution, including both a plan (top) view (as shown in FIG. 1) and a profile (side) view (not shown) of the contaminant plume. The testing can also be quantitative so that the analysis of the site includes concentrations and the concentration data is reduced to concentration contours.

FIG. 2 shows the top perspective view of the remediation site in which injection points 112 are placed in alternate locations at the site to prevent or minimize contaminant migration. In FIG. 2 contaminant periphery line 115, site boundary line 130, and arrow 120, which indicates the direction in which the contaminant(s) migrate(s), can all be appreciated. Also visible are dispersal boundaries 142, which indicates the extent of the soil that is treated at each injection point 112 according to the instant invention, and are roughly cylindrically shaped. In the embodiment shown in FIG. 2, each injection point 112 is placed in an offset grid pattern so that each injection point 112 in second row 146 of injection points 112 is positioned midway between each injection point 110 in first row 147 of injection points 112. It should be understood that FIG. 2 shows one exemplary distribution of injection points 112, and that injection points 112 could be in any pattern or random distribution, including fewer or more injection points than that shown in FIG. 2 and/or extend beyond site boundary line 130.

Referring to FIGS. 1 and 2, it should also be understood that injection points 112 could be advanced beyond contaminant plume 115 specifically to help prevent migration of the contamination off-site, or investigation points 110 already advanced for testing could be used as injection points 112. In addition, in FIG. 2, dispersal boundaries 142 are shown to abut one another. injection points 112 could alternatively be advanced such that there is a space between dispersal boundaries 142 (which would require fewer injection points 112, but still provide a continuous area treated, in, for example, the pattern shown and described with respect to FIG. 2), or injection points 112 could be advanced closer to one another such that dispersal boundaries 142 overlap one another, in the pattern shown in FIG. 2.

Examples of contaminated areas that can be remediated with the method disclosed herein include, but are not limited to the following examples, which also includes a non-limiting example of the sorbent material that is added to remediate the site. Army installations that manufacture, load, assemble, and pack explosives with a medium to fine sand and gravel aquifer contaminated with DNT (pink water), activated carbon with anaerobic treatment and nutrient amendments as necessary can be added according to the instant invention. The same type of installation, but with an aquifer contaminated with DAT (pink water) could be amended by sorption and anaerobic biological treatment, including injection of activated carbon amended with native microbes and slurry with nutrients and ethanol. At the same installation, but with DAT in vadose zone, AC could be injected to prevent migration to groundwater, and injected into a saturated zone as a preventive measure. At a tank farm sand aquifer contaminated with petroleum hydrocarbons, BTEX controls, SMZ with microbes could be injected and a sparge system installed, including periodic sparging to enhance aerobic biodegradation. At a former manufactured gas plant site with an cyanide contaminated silty sand and gravel aquifer, activated carbon and an oxygen source (air, pure oxygen, ozone, hydrogen peroxide, slow release peroxide, groundwater oxygen, materials that cause oxygen to be released from the aquifer materials, etc.) could be injected according to the present invention to treat the aquifer. A fire training site at an USAF Base with a sand aquifer contaminated with jet fuel (JP4) and dioxincan be treated using activated carbon to sorb dioxin and biodegrade JP-4 and retard migration offsite and apply MNA. As another example, a farm with an aquifer contaminated with atraziine could be treated by injecting activated carbon and attenuate and MNA. A gasoline station with groundwater contamination primarily petroleum products and benzene could be treated by injecting activated carbon and then attenuated. A bottling plant with small TCE, I,I,I TCA plume in a clayey aquifer with sand and gravel seams could be treated by the method of the instant invention by injecting the aquifer with activated carbon, then attenuated and allowed to degrade anaerobically, then aerobically, as necessary and MNA. As another example, a former manufactured gas plant (MGP) site with a sand aquifer contaminated with cyanide, BTEX, phenol, naphthalene, and benzo(a)pyrene, activated carbon, nutrients, and microbes could be injected, attenuated, and treated biologically. A refinery with a sludge pond with phenols, injecting activated carbon and slow release hydrogen peroxide sorb and let to degrade aerobically is another example. A church with a leaking underground storage tank and sand aquifer contaminated with fuel oil could also be treated according to the method of the instant invention by injecting activated carbon, sorbed, and degraded and MNA. VOCs, in groundwater, SMZ could be injected to attenuate the VOCs. A power plant with and aquifer contaminated with trace oil, and PCBs, activated carbon to sorb the oil and PCBs could be injected according to the present invention, and extracted (or left in place and MNA). A site with TCE product in the aquifer, surfactant and activated carbon could be injected to solubilize the product and sorb and treat the surfactant-product on the carbon. A dry cleaner with PCE contaminated groundwater, activated carbon could be injected and allowed to sorb the PCE and MNA. As another example, a gasoline station with an ineffective AS system for BTEX could be treated by injecting AC, attenuating, and if necessary degrading aerobically, then MNA. A refinery with petroleum hydrocarbon vapors and hydrogen sulfide gas migrating in the vadose zone to nearby homes with basements could also be treated by the method of the instant invention by injecting activated carbon into the vadose zone to sorb and degrade the groundwater contaminated with BTEX injection only.

Figure 3A:
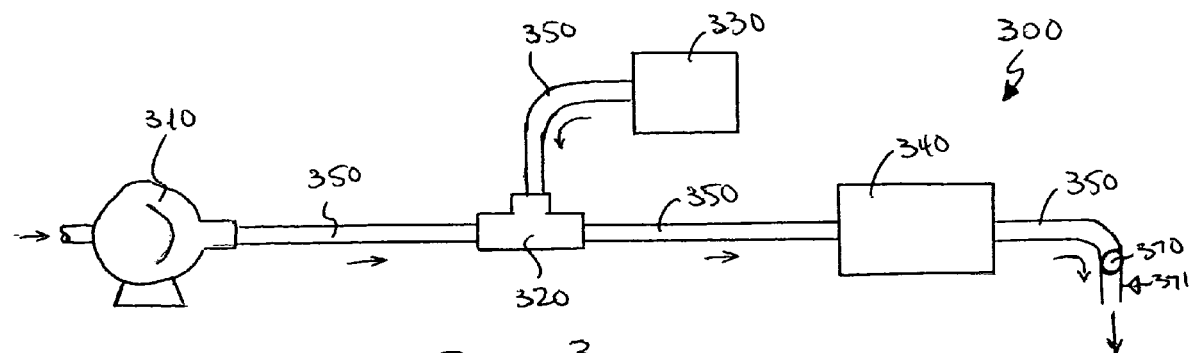
FIG. 3a shows a side view of an education configuration of an injection system for injecting a sorbent/carrier slurry into an injection point.
Figure 3B:
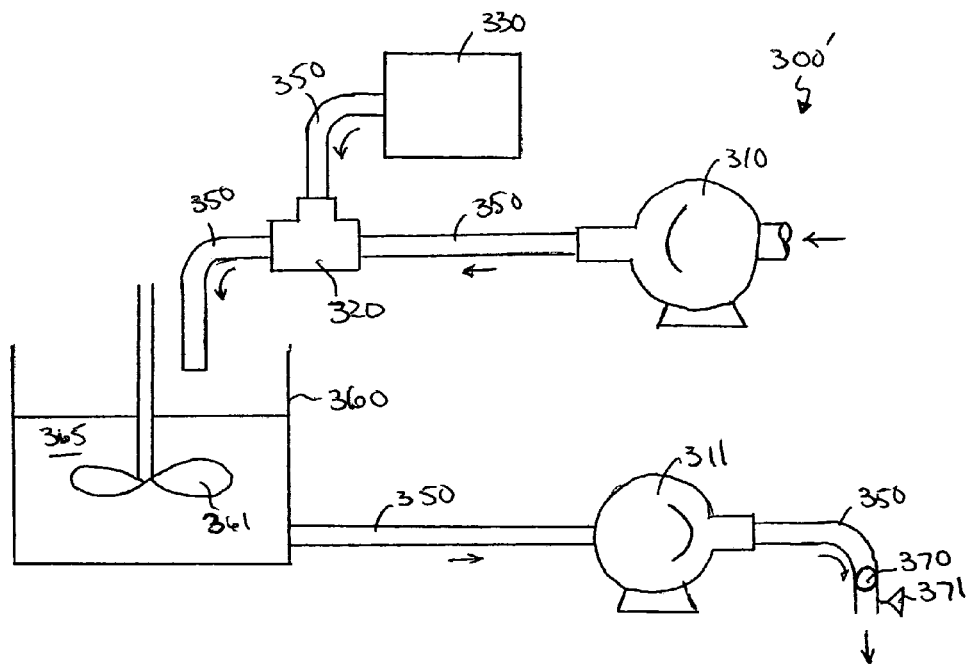
FIG. 3b shows a side view of a mixing configuration of an injection system for injecting a sorbant/carrier slurry into an injection point.

FIGS. 3a and 3b show side views of two mechanisms for injecting a sorbent/carrier slurry into an injection point. FIG. 3a shows an education configuration of injection system 300 in which pump 310, eductor 320, sorbent reservoir 330, inline static mixer 340, check valve 370, and piping 350 can all be appreciated. Pump 310 draws water from a water source (not shown). Although in the embodiment shown water is used as the carrier, alternate carriers could be used (as described infra), in which case pump 310 would draw the alternate carrier from an alternate source. The water (or alternate carrier) then passes through eductor 320 via piping 350. As water passes through eductor 320, due to a negative pressure differential caused by the moving water, a vacuum draws sorbent from sorbent reservoir 330 into eductor 320 and the water passing through eductor 320. In an alternate embodiment pump 310 can be replaced with a blower, a tank, tank of compressed gas or a compressor, a tank of compressed gas fed by a blower or compressor, or gasses could be injected into pipe 350 after check valve 370 through quick coupling 371. Air flow to quick coupling 371 may be regulated with a valve. In many instances gaseous injection will provide more favorable emplacement and distribution then liquid injection, including wider ROIs. Alternate pulsing of liquid and gasses and pulses of varying duration and volume can also help distribute the material. In an alternate embodiment, an additional variable speed drive pump or variable speed drive screw conveyor could deliver sorbent material to eductor 320. Also connected to eductor 320 via piping 350 is an inline static mixer 340. The mixture of carrier and sorbent exits eductor 320 and passes through inline static mixer 340 which mixes the water and sorbent. The water then passes through check valve 370 which does not allow flow to move backwards towards the static mixer. The mixture exits the check valve and the sorbent-carrier slurry is then injected into the contaminated soil according to the method of the instant invention as discussed herein. The education configuration of injection system 300 is particularly useful for a continuous injection system and should be able to produce a water slurry with up to about a twenty percent (20%) by weight sorbent within the carrier with activated carbon, as one example, a two hundredths of one percent (0.02%) to two percent (2%) by weight solution is sometimes used for benzene treatment with activated carbon for example. For gas injection a slurry of about twenty five thousandths of one (0.0025) percent to eight (8) percent by volume activated carbon may sometimes be used for benzene. Although different percent sorbent-carrier mixtures may be used. As an example, in some cases, gas flow rates of ten (10) cubic feet per minute (cfm) to one hundred (100) cfm, from a tank of compressed gas fed by a blower or compressor, or from a compressed gas tank, are effective. Different flow rates may also be effective. Sometimes pulses lasting one minute or less of 20 cf to 60 cf of nitrogen, or other gasses or aerosols, injected in a vertical interval of about one foot may be used. Other volumes of gas and different time intervals and larger or smaller injection intervals may also be effective depending on the formation. These injections may use a nozzle slotted like well screen.

FIG. 3b shows a mixing configuration of injection system 300' for injecting a sorbent/carrier slurry into an injection point. As with the embodiment shown and described with respect to FIG. 3a, injection system 300', pump 310, eductor 320, sorbent reservoir 330, check valve 370, quick coupling 371, and piping 350 can all be appreciated. However, in this embodiment, rather than the sorbent/carrier slurry passing from eductor 320 to an inline static mixer, it is deposited into mixing container 360 where it is agitated by impeller 361 which keeps the sorbent suspended within the carrier (as indicated by number 365, sorbent/carrier slurry). One of ordinary skill in the art should recognize, however, that any mechanism or method can be used to agitate sorbent/carrier slurry 365, as long as injection system 300' prevents the sorbent from settling from or precipitating out of the carrier. Sorbent/carrier slurry 365 is maintained within mixing container 360 until required. Second pump 311 then extracts sorbent/carrier slurry 365 from mixing container 360 when required, and sorbent/carrier slurry 365 is then injected into the contaminated soil according to the method of the instant invention as discussed herein. The mixing configuration of injection system 300' is particularly useful for a continuous or non-continuous injection system and should be able to produce a water slurry with up to approximately a forty percent (40%) or more by weight sorbent within the carrier with two hundredths of one percent (0.02%) to two percent (2%) by weight solution is sometimes used for benzene treatment with activated carbon for example. Although higher or different weight percents are sometimes used. Injection through injection point(s) 110 when they are wells may also be effective, and can be at low flow rates with moderate to higher pressure for example between one-half (0.5) and five (5) gallons per minute per foot (gal/min/ft), but possibly as low as one tenth (1/10) and as high as ten (10) gallons per minute per foot (gal/min/ft) per injection point 110. Those practised in the art will recognize that due to the variability of slurry mixes, formations, and treatment objectives other flow rates may be required, and low flow rates and low pressures may also be effective in some cases. It is considered that emplacement in soils in which silts exceed twenty percent (20%) is likely very difficult, and expected to be even more difficult are silty clay soils for example. For the latter, targeting more permeable seams may be a good approach.

In one embodiment of the invention, water is the carrier for injection (extraction) of the sorbent material. Other carriers including guar gum, hydrogen, or oxygen release materials, often mixed with water, may also be utilized depending on characteristics of the aquifer formation. The carrier may include amendments such as nutrients, micronutrients, co-substrates, electron donors, electron acceptors, microorganisms, molasses, food grade oils, substances that release hydrogen and oxygen, chemical oxidants, buffers, phosphoric acid, and other active materials.

In one embodiment of the invention, material is placed in the proximity in and around an existing air sparge or pump and treat systems to enhance their performance. The system may operate for some period of time and require the addition of bioenhancements and amendments, or not. Similarly, in another embodiment of the invention, the material may be used in a new system as a new hybrid type of enhanced AS (HAS), or P&T system established by this invention.

In one embodiment of the invention, the method may be used to treat contamination in bedrock, or at sites with contamination in karst geology. At these sites, there may be few in-situ remediation alternatives, owing to little or no soil to promote various natural processes to naturally attenuate contamination combined with often low or no organic materials in the formation to attenuate contaminants, or with voids (such as in karst limestone formations) so large and difficult to access they make it difficult to treat contaminated media (including) groundwater. Typically, soil void space is in the range of about twenty-five percent (25%) to about fifty percent (50%), depending on the type of soil, with an average void space between approximately thirty percent (30%) and approximately thirty-five percent (35%).

In this embodiment, coated AC containing microbes and nutrients, may be injected with chemical oxidants, and slow release oxygen and hydrogen (coated) to allow for staged time release and treatment of the target contaminant. This allows, for example, for the treatment of PCBs in Karst geology, where the chemical oxidant would release first and first degrade the PCBs to the extent practible, followed by the timed release of aerobic treatment, and followed finally by the timed release of anaerobic treatment. The order of staged treatment may vary, and other contaminants may be treated in a like fashion. In another instance, injected activated carbon may be allowed to stay in place, and periodically chemical oxidants may be injected to clear the carbon of contaminants or other materials fouling the activated carbon, with bioenhencements added subsequently. Alternately, the density of the coated particles could be set roughly to the density of water. The neutral or slightly positive buoyancy would allow activated carbon particles greater than one (1) micron to move with the groundwater in the Karst formation, and the coating could be set to dissolve when enough time has passed for the particles to migrate to where intended. Once the coating dissolves, the particles will settle, creating a permanent attenuation zone heretofore impossible. Likewise a sugar coating under perhaps another coating resistant to oxidants may be desirable in this instance, as sugar is not adsorbed by activated carbon, and as the sugar dissolves it will not impact carbon performance appreciably. Outer coatings containing surfactants may also be help suspend various sized particles before dissolving, to allow for dispersed placement. Alternatively various reactive solids or liquids may be coated or protected to enhance the treatment process, sometimes with more permanent controlled release coatings or coatings themselves that may contribute to the process. In another embodiment activated carbon is injected, and ozone is injected (sometimes after carbon placement) in sometimes the same or sometimes separate or different wells. The activated carbon acts to increases the generation of free radicals from the ozone, strengthening the reaction, and significantly improves oxidation of organic contaminants. This allows the carbon-ozone process to treat contaminants normally resistant to treatment with ozone alone. Ozone concentrations should be less than about ten (10) percent, as higher levels may degrade the carbon, but this may vary and should be confirmed with testing.

These are only a representative examples of such staged treatment. Once again, the contaminant, PCBs in this instance, would sorb onto the particles where, under enhanced conditions, the bacteria attached thereon would degrade the sorbed PCBs. Alternatively TCE may be treated in a similar fashion, using chemical oxidants, only reversing the order using anaerobic treatment first, then aerobic. In this embodiment, the inherent lightness of AC would be beneficial. The method of the instant invention uses a sorbent material with a dry bulk density, less than approximately 50 lb/cf.

TABLE 1

| Material | Dry bulk density in lb/cf |
| --- | --- |
| Activated carbon | 19-33 lb/cf | provides a representative sample of particles that can be used to sorb contaminants.

It may also be desirable in this instance to use very fine AC particles, particles with a size of one (1) micron or less (colloidal size) to the extent practible (sometimes with injection/extraction). This will allow particles to flow more readily and help distribute treatment throughout the formation. Particles less than one micron in size (nano-scale) may be injected for permanent emplacement if H-type carbon is used. To increase the mobility of such particles they can be coated for timed release and have a roughly neutral to positive buoyancy. However, the use of particles with a size of at least one (1) micron will help prevent the migration of the sorbent particles for most sorbent materials, thus creating a more permanent and stable implacement of the sorbent material. In one embodiment the sorbent material itself biodegrades enhancing treatment of the sorbed contaminant. Testing, including Norit S51HF and Norit Darko Insul activated carbon, has shown particles one (1) micron or greater settle in about one day or less. Activated carbons come in various particle size distributions. Sometimes small quantities of particles less than one micron may be present in the particle size distribution as a result of the manufacturing process. In one embodiment the intent of the instant invention is to provide for the use of particles that are predominantly one micron or greater in size. As long as the majority, greater than ninety five (95) percent), of the particles in the particle size distribution are greater than one micron, and the particles settle in a reasonable period of time relative to groundwater migration, this sorbent material is defined as being greater than one micron in size for the purposes of the instant invention. Generally, sorbent material particles having a size of less than one (1) micron may not settle and may migrate either within the contaminated site or off site unless adequately matched to the particle size of formations so they do not migrate or erode.

Should extraction of the particles, or other need to remove the particles following the in-situ treatment be envisioned, the designer should note that the treatment and removal of particles about one (1) micron or less can be more costly and difficult then the removal from water of larger sized particles. Processes such as settling and other such less expensive technologies may not be effective over this size range. In such a scenario, removal may require the application of coagulants and subsequent precipitation, or use of processes such as microfiltration, ultrafiltration, and nanofiltration type treatment systems.

Some coated (timed release) particles may contain nutrients and microorganisms for aerobic treatment, and some particles contain all together different microorganisms, and nutrients for anaerobic degradation, and some particles contain oxygen, or other amendments to stimulate biological aerobic or anaerobic biological activity and timed to release during that treatment stage. And the particles coatings are such that they will dissolve at different times, or allow for controlled release of materials, and allow for staged-treatment temporally and spatially.

In one embodiment of the invention, use of the media may not rely on biological processes to treat the contaminant on the particle. Rather the design may attempt to attenuate the contaminant to slow or almost stop its normal migration through the aquifer. This may be used where the contaminant is recalcitrant and not easily degraded. Likewise, in this example, placing the treatment within the context of monitored natural attenuation may also be helpful. This may be preferred for sites with PCB contamination and sites where the contaminant is sorbed tightly to the sorbent material and the material is left in place, or alternatively to be extracted on the sorbent material.

In one embodiment of the invention, a method for a new treatment system is presented. In this embodiment, air sparge wells are installed, and adsorptive active material is injected. The combination has significant benefit in improved treatment, reduced treatment time, and thereby significant cost reductions. The sorbent material is allowed to sit for a period of time to attract as much of the contaminant as reasonable/feasible from the contaminated material (sometimes an aquifer), then the sparge system is turned on to promote contaminant stripping from the soil/groundwater, further contaminant and amendment mixing in the target zone and promote active biological growth and treatment of the contaminant on the sorbent material. Pulsing the air sparge portion of this system may also be advantageous. Such a treatment system would be useful for substances that may be degraded aerobically such as gasoline constituents and BTEX.

However, it should be noted that adding air or oxygen to the formation through sparging (and injection) can shift geochemical equilibriums and push some inorganic constituents to precipitate out of solution. Thus, the site remediation designer should evaluate the water chemistry at the site for constituents that could precipitate out of solution. Some constituents that could precipitate and foul media include, but are not limited to calcium, magnesium, and iron. If precipitation is identified as a concern, the designer may consider several options. As an alternative, the designer may use alternative electron acceptors such as nitrate or sulfate in place of oxygen or rely on anaerobic treatment or monitored natural attenuation. While treatment may be slowed under these alternates, they may offer effective treatment nonetheless. If gasses are injected control of subsurface vapors should be considered to limit migration into adjacent basements etc., as gases can be hazardous, and may be toxic or explosive.

In one embodiment of the invention, the sorption and/or other active materials may be used as a polishing step to address residual contamination that remains in contaminated media following the application of other treatment technologies, or technologies that are having difficulty achieving treatment objectives. In this instance the approach may rely on the sorbent material to enhance and expedite site closure through monitored natural attenuation. The application of sorbent material in this instance will first, initially decrease the amount of contaminant in the aqueous phase, shrinking the effective size of the contaminant plume. Second, the sorbtion/desorption of contaminants to the sorbent material will significantly slow the migration (movement) of contaminants in the aquifer, and third, this slowed movement and partitioning to the sorbent material will allow more time for naturally occurring processes to attenuate and degrade the contaminant in the aquifer. This will reduce remediation costs and expedite closure of the site using natural attenuation.

Often a mix of contaminants may be present. Contaminants that do not sorb as readily as others may still be treated by biological processes enhanced by microbes consuming contaminants on the sorbent material, amendments to enhance biological activity may be useful in this case. In this instance, other less expensive materials such as diatomaceous earth which provides a good place for microorganisms to grow while not having strong sorption properties, may be used to supplement the more expensive sorbent materials. Alternatively, such contaminants may also be pretreated to make them more available for subsequent sorption and biological treatment. In other cases a number of contaminants are present, but one controls the design.

In one embodiment of the invention, sorbent material is utilized so that sequenced treatment either spatially or temporarily may be achieved. Thus multiple contaminants may be treated, or a single contaminant may undergo a series of treatments to most effectively remove the contaminant and most effectively utilize contaminated media and/or aquifer characteristics.

The method can be used to form a treatment zone that mitigates the movement of contamination deeper by extending the sorbent materials to include contaminated areas and uncontaminated areas beneath the contaminated areas to help reduce the downward migration of contaminants, and/or treat the contaminant(s) before they migrate downward. This is particularly useful for contaminants that are heavier than water (including chlorinated compounds such as PCE). These contaminants tend to sink in an aquifer and migrate downward within the aquifer. PRBs are not able to address migration downward by contaminants.

In one embodiment of the invention, the sorbent material is injected into sediments, sludges, or soils, to attenuate and treat contaminants in the sediment, sludges, or soils in place. However, the excavated sediment, sludges, and soils may also be treated after excavation in a similar fashion, and sometimes replaced in the excavation. The addition of the sorbent material would enhance such treatment.

In one embodiment, the sorbent material is placed in a dispersed fashion in soil above the groundwater (the vadose zone), to create a biological attenuation zone where gas or vapors from contaminated soil is treated and/or prevented from migrating to human or other receptors. The contamination in the soil media may also be treated.

In one embodiment of the invention, in a contaminated aquifer, the aquifer conditions are actively manipulated to enhance the retardation and treatment of petroleum hydrocarbons (or other contaminants) through activated carbon injections with nutrients and continuous oxygen addition.

In one embodiment, microencapsulated (or otherwise coated or not coated) activated carbon treated with microorganisms and nutrients is injected at the same time as chemical oxidants. The coating on the particles would be timed to decay sometime after the chemical oxidants have exhausted their reactivity. If oxidants such as ozone are used, compatibility of materials (seals, pipes, pumps) to ozone should be considered, as concentrations of ozone and other oxidants may degrade many materials. Ozone may also change the activity of the carbon or cause changes to the carbon at high concentrations, generally when ozone levels are above ten (10) percent. Iron and other constituents, for example, may be a problem (precipitation etc.) when using ozone or other oxidants, and should be considered on a site by site basis.

Generally, chemical oxidants are costly and thus are implemented in a limited area with high levels of contaminants. However, two problems result: typically some contaminant residual remains and microbes in the area of treatment are often killed, though killing the microbes may be helpful and allow extended sorption times prior to onset of biological treatment.

Typically, residual contamination remains, sometimes, in a reduced form that is more amenable to biological treatment following treatment with chemical oxidation. A die off of microorganisms is also often observed following chemical oxidation, and in some cases partially degraded organics. These conditions will provide an optimal environment for application of sorbent materials (attenuation with natural and enhanced biological treatment).

The injected carbon will attract and sorb residual contamination, and microorganisms will grow on the carbon and degrade the attracted contaminant. In addition, the microbes on the carbon will allow for a rapid rebound of the microbial community in the aquifer amended materials, resulting in a more rapid effective treatment overall.

In one embodiment of the invention, the method may be practiced by performing the following steps, which are intended to determine the best sorbent material to be introduced in to the site. It is important to note that not all of the steps need be performed for a particular contamination site, nor must the steps be performed in any specific order, and more or additional steps can also be added.

determining aquifer and formation properties relevant to application of the sorbent material, identifying the contaminant(s) and it/their properties affecting application of the sorptive material, performing bench scale and full scale testing for application of sorbent material (as necessary),
identifying the appropriate location in the contaminant plume to place the sorbent material,
identifying the best injection (injection/extraction) method, layout/pattern,
identifying the most effective sorbent material,
determining the quantity of media,
identifying contact time for the sorptive material,
identifying the best carrier for injecting the sorbent material, and
identifying whether amendments for the sorptive material (composite material) itself and/of for the carrier can be used to enhance sorbent material performance, the need for staged treatment zones, and different types of active materials.

The sorbent material(s) are such that they attract contaminants from the aquifer or soil vapors. They provide as much surface area as possible for attracted contaminant(s) to adhere to. The contaminant(s) tends to be held tightly by the sorbent material, and the sorbent material provides a favorable environmental environment for the growth of microorganisms, including nutrients.

The sorbent material, depending on the site microbial conditions, may not be amended with nutrients or microbes, but may instead rely on nutrients available at the site, and rely on native microorganisms populating the sorptive material.

The sorbent material may be active physically, biologically, or chemically, or may be combined with or be used to form composites with other biologically, physically, or chemically active (from a treatment perspective) materials.

Compounds treated by the instant invention include compounds subject to either sorption to slow contaminant migration, enhanced monitored natural attenuation, activated carbon catalyzed reactions, precipitation, biological treatment, hybrid air sparging, and hybrid chemical oxidation-adsorption-biological treatment. It is considered that broad groups of compounds may be treated by these methods as incorporated herein by reference, Remediation Technologies Screening Matrix and Reference Guide, 2nd Ed., DOD Environmental Technology Transfer Committee, October 1994, EPA/542/B-94/013. Following is a non-exhaustive list of exemplary specific compounds and classes of compounds that may be treated by the method discussed herein:

VOCs: Halogenated: 1,1,1-trichloroethane, 1,1,2-trichloroethane, 1,1,2,2-tetrachloroethane, trichloroethylene, tetrachloroethylene, vinyl chloride, 1,2-ichloethane, 1,1-dichloroethane, 1,1-dichlorethylene, 1,2-trans-dichloroethylene, chloroethane, carbon tetrachloride, halogenated aliphatics, chlorobenzene, chloroform, trichlorofluromethane, methylene chloride, methylene bromide, bromoform, 1,2-dichloropropane, 1,3-dichloropropene, bromodichloromethane, bromomethane, chlorodibromomethane, chloromethane, chloropropane, cis-1,2-dichloroethylene, cis-1,3-dichloropropene, dichloromethane, ethylenedibromide, flurotrichloromethane, hexachloroethane, and 1,2-dichloroethene; Non-halogenated: acetonitrile, acrolein, cyclohexanone, aliphatics, aromatics, monocyclic aromatics, styrene, methyl ethyl ketone, methyl isobutyl ketone, 4-methyl-2pentanone, isobutanol, tetrahydrofuran, vinyl acetate, acetone aromatic hydrocarbons, benzene, toluene, ethylbenzene, xylene, nitrobenzene, 2,4-dinitrotoluene, 2,6-dinitrotoluene, isophrone.

SVOCs: Halogenated SVOC: 1,2-bis(2-chloroethyloxy)ethane, bis(2-chloroethoxy)methane, bis(Chloromethyl)ether, aliphatics, bis(2-chlrethyl) ether, 2-chloroethyl vinyl ether, 4-bromophenyl phenyl ether, bis(2-chloroisopropyl) ether, 4-bromophenyl phenyl ether, 4-chloroaniline, p-chloro-m-cresol, 2,4-dichlorophenol, 2-chloronaphthalene, 1,3-dichlorobenzene, 1,4-dichlorobenzene 3,3-dichlorobenzidine, aromatics, hexachlorobenzene, hexachlorobutadine, hexachlorocyclopentadine, phenols and cresols, pentachlorophenol, tetrachlorophenol, 2-chlorophenol, 2,4-dichlorophenol, 2,4,6-trichlorophenol, 2,4,5-trichlorophenol, 4-chlorophenyl phenylether1,2-dichlorobenzene, 1,2,4-trichlorobenzene, bis(2-chloethyloxy)pthlate, polychlorinated biphenyls (arochlor 1016, arochlor 1221, arochlor 1232, arochlor 1242, arochlor 1248, arochlor 1254, arochlor 1254, and arochlor 1260). nonhalogenated SVOC: benzidine, benzoic acid, bis(2-ethylhexyl)phthalate, di-n-octyl phthalate, dibenzofuran, di-n-butyl phthalate, dimethyl phthalate, diethyl phthalate, butyl benzyl phthalate, phenol, 2-nitrophenol, 4-nitrophenol, 2,4-nitrophenol, 2,4-dinitrophenol, 2,6-dinitro-o-cresol, 4,6-dinitro-2-methylphenol, p-chloro-m-cresol, 2,4-dimethylphenol, phthalate esters, 2-nitroaniline, 3-nitroaniline, 4-nitroaniline, isophorone, n-nitrosodimethylamine, n-nitrosodiphenylamine, n-nitrosodi-n-propylamine, phenyl naphthalene polynuclear aromatic hydrocarbons (PAHs); acenapthene, acenaphthalene, anthracene, benz(a)anthracene, polycyclic aromatics, benzo(b)fluoranthene, indeno(1,2,3-c,d)pyrene, dibenzo(a,h)anthracene, benzo(k)fluoranthene, benzo(g,h,i)perylene, benzo(a)peryene, PAHs, chrysene, flourene, fluoranthene, pyrene, phenanthrene, naphthalene, 2-chloronaphthalene, 2-methylnaphthalene, benzidene, 3,3-dichlorobenzidine, pesticides, herbicides, and dioxin; endosulfan I, endosulfan II, endosulfan sulfate, BHC, aldrin, dieldrin, 4,4-DDE, 4,4-DDD, 4,4-DDT, endrin, endrin aldehyde, ethion, heptachlor, dioxins, furans, pesticides, herbicides, atrazine, heptachlor epoxide, chlordane, toxaphene, malathion, methylparathion, parathion, and 2,3,7,8 tetrachlorodibenzon-p-dioxin (TCDD).

Fuels: product, gasoline, diesel, jet fuels (JP-4, etc.) various fuel constituents, BTEX, PAHs, phenols, cresols, aliphatic compounds, and aromatic compounds.

Explosives: TNT, nitrosamines, n-nitrosodiphenylamine, n-nitrosodimethylamine, n-nitrosodi-n-propylamine, RDX, HMX, TNB, DNB, nitroaromatics, 2,4-DNT, and 2,6-DNT.

Inorganic compounds: cyanide species, and arsenic species.

There are also a number of materials that may be used as sorbent material. The sorbent material can consist of a variety of materials or be a composite of a number of different materials, and amendments that are combined together have advantageous sorption and treatment properties, such as, but not limited to, activated carbon, polymeric substances, peat, calcium alginate, activated alumina, humate, clay, zeolite, biosolids, surfactant modified silicates, metal oxides, resins, and other substances, and composites of various materials polymeric substances, surfactant modified alumniosilicates, metal oxides, resins, and other substances. The type of sorbent material and method will depend, to some extent, upon the application and the target contaminant(s).

In addition, three examples include activated carbon, which is useful for organic contaminants. The particle size of the sorbent material will vary depending on the aquifer formation (or contaminated media) characteristics, whether the sorbent material is to be left in place or extracted after a period of time, and the desired purpose or design, and other constraints such as treatment time frame, and method of application. The particle size can be matched to the grain size distribution of the soil or aquifer being treated. That is, a sorbent material with too small a particle size may migrate within or through the contaminated site, and a sorbent material with too large a particle size may not be able to be introduced in a dispersed fashion within the soil or aquifer to be treated. In one embodiment of the method, a sorbent material is matched by choosing a sorbent material such that the average pore size of the formation is at least three (3) to ten (10) times the maximum particle size of the sorbent material. That is, a sorbent material is chosen with a particle size that is about one third (⅓) or less than the average pore space size. This will distribute the sorbent material in the most homogeneous manner, and allows for placement that does not fracture the formation. But depending on injection method, amendments, etc. this may vary. For example, if a gas, or other low viscosity fluid, is used for injection the maximum particle size may be increased so the particle size may approach the pore size of the formation, for poorly sorted soils. In another embodiment of the present injection method, a sorbent material is chosen such that the minimum particle size of the sorbent material is greater than or equal to approximately one (1) micron when fracing the soil or aquifer to be treated. When fracing, micro fracing is preferred. It may also be helpful to conduct site specific testing to confirm injection of sorption material sizes, and injection methods.

In addition, a number of materials and amendments may be used with the sorbent material. The sorbent material may, for example, be amended with nutrients, microorganisms, yeast, enzymes, electron acceptors, electron donors, or other substances to enhance contaminant removal and treatment. Conversely the sorbent material may be placed and sometimes injected along with substrate, co-substrate, electron donors, nutrients, electron acceptors, enzymes, surfactants, microorganisms, yeast, chemical oxidants, ozone, calcium hypochlorite, nitrate, substances that release hydrogen or oxygen, iron, and other substances that act to treat (or help treat) the contaminant in their own right, physically, chemically, or biologically, such that the substances act in concert with the sorptive material to enhance contaminant attenuation, treatment, and/or removal, and that the sorptive material significantly enhances the normal treatment or effect achieved with these materials or processes thereby creating new and distinct adsorbent material processes.

The sorbent material may also provide for some other treatment thereon, or be used in sequence with, or to enhance the performance of other chemical, physical or biological processes or treatments such as chemical oxidation, ozone, surfactant flushing, substances that release hydrogen and oxygen, monitored natural attenuation, pump and treat systems, air sparging systems, or in-situ biological processes such that the addition of the staged treatment that includes the sorbent material significantly enhances the treatment processes and a new sorbent material process is thereby created. The sorbent material can also be used to create staged treatment zones with different treatment processes, for single or multiple contaminants, and various objectives. Injected sorbent materials and/or amendments may also be of a timed release type to allow for an extended period of activity and vary the treatment scheme and/or treated zone spatially and/or temporally. In some instances, less expensive materials such as diatomaceous earth may be used in a zone to provide a location for microbes to grow.

In one embodiment, activated carbon is the sorbent material, although a number of other materials may also work well, as described herein. Activated carbon works primarily by adsorbing or attracting, accumulating, and concentrating contaminants at its surface. Microorganisms have an affinity for carbon, which is a positive aspect of the properties of carbon, whereby the carbon first attracts the contaminants, and then provides a somewhat optimal site on which the microorganisms may grow and degrade the sorbed contaminant. Activated carbon is also readily available commercially and generally comes as a powder or granules. Activated carbon may be purchased in a range of quantity from smaller bags (roughly 25 lbs.) to super sacks of roughly five-hundred (500) pounds, or in tanker truck quantities.

Activated carbon particles may range in size from less then two (2) microns (super fine powder) to over ten (10) millimeter (granular). Carbon with particle sizes less than one micron, or other sizes or distributions can be produced if necessary. Acid washed activated carbons have an advantage over other activated carbons, as non-acid washed carbons may release metals upon emplacement in the aquifer. These metals may themselves be a regulated contaminant. Testing for metals leaching from the carbon may be beneficial. The ability of activated carbon to adsorb large quantities of organic and inorganic molecules from solution is a function of its porous structure and resulting high surface area, ranging from about five hundred square meters per gram (500 m$^2$/gm) to one thousand four hundred square meters per gram (1,400 m$^2$/g). For example, activated carbon may sorb organic substances up to approximately fifteen percent (15%) by weight, and up to between approximately five percent (5%) and approximately ten percent (10%) by weight benzene. This will vary depending on water quality conditions, contaminant, and carbon used, and typically tests with the carbon and actual site water and soil are conducted. The method of the instant invention uses a variety of sorbent materials with different surface areas greater than approximately 50 m$^2$/g. Table 2 provides a representative sample of particles that can be used to sorb contaminants and their surface areas.

TABLE 2

| Material | Surface area in m$^2$/g |
|---|---|
| Activated carbon | 500-2,500 m$^2$/g |
| Peat | 200 m$^2$/g (variable) |

The number of types of activated carbon and their different properties depend on their source material, the activation method, and production technique. Activated carbon may be made from a variety of carbonaceous materials that include coal, lignite, peat, wood, lignin, nut shells, bamboo, bagasse (sugar cane pulp), sawdust, bone, and petroleum residues. The most typical commercial carbons are lignite, bituminous, and coconut shell-based carbon for use as a sorbent material. These materials with high organic carbon content then undergo a process that significantly improves their sorption properties, i.e., they are activated.

Varying physical properties of importance for activated carbon include significant surface area of the material (on average 1,000 m$^2$/g, but variable), a variety of pore sizes (micro (<2 nm), meso ($\geq$2 nm to <50 nm), and macro ($\geq$50 nm) pores), and different proportions and geometries of these pores. For activated carbon, generally a smaller particle is more reactive from a sorption standpoint. However, one of the arts of using activated carbon involves matching, to the extent practicable, the carbon pore sizes to the contaminants to be adsorbed, while taking into account other organics present in the groundwater, and potential interferences with the sorption process. The designer of the remediation process should also be aware that changes in pH may result in desorption of contaminants from the carbon. While not considered likely, due to the potential to use this process with other methods, this should be considered.

Surfactant modified zeolites, generally have an affinity for inorganic species due to their charged surface. Modification of the zeolite with surfactants (i.e., surface active agents) has proven to be an effective way to change the alumnosiicates so that they also attract (sorb) organic contaminants as well. As with activated carbon, surfactant modified zeolites may also provide a site promoting biological growth.

Composite particles such as carbon-polymers (a composite made of carbon and polymers) such as Nochar, which reportedly can achieve absorption of organics up to twenty-five percent (25%) by weight. Other potential sorbents are humate, peat (due to its high carbon content and ability to sorb contaminants), and calcium alginate which provides a site for microbes to attach and grow additional sorbent compounds. Substances such as diatomaceous earth may also be used as a support for biological growth.

Microorganisms (bacteria) range from approximately 0.02 microns to approximately 7 microns. Based on the United State Department of Agriculture System, the size of soil particles are: clay <0.002 mm; silt 0.002 to 0.05 mm; sand 0.05 to 2 mm; and gravel >2 mm. Also, clays tend to have a higher content of organic matter than sands and gravels. Activated carbon particles may range in size from less than 2 microns to about 5 mm. Thus, at a site with clay soils, in some instances, it may be beneficial, to the extent practicable, to use as large a size activated carbon particle as possible with large and numerous macro pores so that microorganisms may have a place to grow in the event the room in the soil matrix is limited. Or it may be desirable to use more carbon of a smaller size and rely primarily on sorption to retard migration and less on biological degradation. Such considerations will be familiar to those practicing the art, and are usually resolved through testing and design evaluations.

Microorganisms can also be used with a sorptive material. It is generally best to rely on native populations of microorganisms at the site, rather than introduce non-native or engineered microorganisms, as long as the native populations are capable of degrading the targeted contaminant. This is because the native microorganisms will generally be best adapted to the conditions and contaminants in the subsurface at the site, and therefore the native organisms will typically out-compete introduced organisms and will typically come to predominate subsurface microbial populations at the site any way. As an alternative, the designer may incubate and grow native microorganisms that degrade the target contaminants and inoculate either the aquifer or injected materials such that these microorganisms become distributed in the aquifer and materials in the area to be treated.

However, the designer may want to create conditions that are favorable to select native microorganisms at the site that have an affinity for the target contaminant(s). The degrader populations may be identified through biological testing and the specific strains may be identified using gram negative/ positive type or other tests. Referencing microbiology texts may then give insights into conditions for their optimal growth. Such conditions can be created at the site to the extent practicable.

The select microorganism(s) will vary depending on the target contaminant, and may be aerobic, anaerobic, anoxic, or co-metabolic. For example, aerobic microorganisms would typically be used to degrade petroleum constituents such as benzene, while anaerobic or co-metabolic microorganisms could be used for chlorinated aliphatic compounds such as PCE and TCE. However, those practicing the art will recognize that many contaminants may be degraded under various conditions, albeit at slower rates if optimal conditions are not feasible. The conditions under which such microorganisms thrive are different. The designer may focus on creating and or enhancing the conditions under which the select degrader microorganism(s) thrive. As such, different amendments, nutrients, micronutrients, electron acceptors, co-substrates, etc. may be used and will vary from site to site. For example, if petroleum constituents are targeted, the designer may add oxygen by sparging (or particulate that provides for the slow release of oxygen), nutrients, and micronutrients as may be determined to be limiting to biological growth or other such supports to microbial activity as may be deemed necessary to enhance the biodegradation of the target contaminant(s).

Should the designer decide it is beneficial to introduce microorganisms (bioaugmentation) with the sorbent material (native or non-native microbes) prior to emplacement, the injected material may be treated with the microorganisms (and/or nutrients). In some instances, microorganisms that degrade the target contaminant may not be present. For example, a strain of bacteria for degrading chlorinated aliphatic compounds such as TCE and PCE have been identified, but may not be present at the site. These microorganisms may be collected from a site where they are present and seeded at the site requiring treatment. Identification of the presence of these microorganisms may be determined using genetic sequencing, gram negative, gram positive or other similar methods used by those familiar with the art. In other instances, prior art exists for a genetically modified bacteria that has an affinity for the contaminants, again the site may be seeded with these microbes to enhance treatment of the target contaminants. Seeding may take place by incubating and growing a high concentration of the microbes and introducing the microbes into the aquifer with water or other means, or by inoculating the sorbent material with said microbes, prior to injection. In addition, in some instances, seeding with two (2) different types of microorganisms is beneficial.

Nutrients can also be used with a sorptive material (biostimulation). Primary nutrients include nitrogen and phosphorous, but depending on site conditions, other nutrients and micro nutrients required by microorganisms may not be present and would need to be added. Other important nutrients include potassium (which activates various enzymes), magnesium (which activates enzymes involving phosphate transfer and helps stabilize ribosomes, cell membranes, and nucleic acid), calcium (which stabilizes cell walls), iron (which is essential as an electron carrier in oxidation-reduction reactions), and sodium (though not required by all microorganisms).

Exemplary micronutrients include, but are not limited to, cobalt, zinc, molybdenum, copper, and manganese. Some products commercially available are amended with a mix of nutrients that can support biological activity and contain nitrogen, phosphorous, potassium, and various other nutrients (e.g., Zeopro). The nutrient mix required will vary from site to site and depend on which microbes are to be stimulated. However, for aerobic biological systems, a rough ratio of approximately 100:10:1 (BOD:N:P) may be used as a starting point, and testing to confirm optimum ratios and effectiveness may be helpful.

Generally, nutrient addition will involve the provision of nutrients needed by microorganisms to generate cell mass and maintain bodily functions, so design of nutrient addition will include an evaluation of the substances making up the bacterial cell and ensuring a like quantity of these substances is available to microbes in the subsurface. Percentage of dry weight of various elements making up a bacteria for some strains is Carbon-50, Oxygen-20, Nitrogen-14, Hydrogen-8, Phosphorous-3, Sulfur-1, Potassium-1, Sodium-1, Calcium-0.5, Magnesium-0.5, Chlorine-0.5, Iron-0.2, and all others 0.3, as one example. But the designer should check site conditions first and determine whether nutrient addition is necessary, and the levels of addition required. Determining levels of nutrients in the aquifer, levels of nutrient addition required can then be determined from the stoichiometric and half reactions involved in biological degradation of the contaminants and/or substrate as appropriate. Testing to ensure nutrient additions, or the lack thereof, have the desired effect may also be desirable.

The geology and hydrogeology of the site and the depth of the injection will have an impact on the ability to inject materials, radius of influence of the injection, size of particles injected, injection flow rate, injection pressure, and the equipment used to inject the materials into the subsurface.

Injection Methods. For the purposes of this discussion, "injection" is used as a term describing any means of introducing materials, including a slurry, into the subsurface, without fracing the formation. This may include injection using pumps, blowers, compressors, tanks, tanks of compressed gas, a compressed gas tank (tanks of compressed gas and compressed gas tanks include compressed gas cylinders) after a blower or compressor and a geoprobe rig, hand-held injection rods that in part use the force of the injection slurry to advance the injection probe into the subsurface (applicable to shallower depths), use of wells, galleries, trenches, or horizontal wells and borings to introduce the injected material into the subsurface.

The injection method allows for flexibility in design due to the relative ease of adding more sorbent material if necessary. Subsequent applications of the sorbent material and different treatments modes, within the same or different areas of the contaminant plume, are also possible by virtue of the same injection flexibility. Pilot testing may be useful to confirm the injection method, injection pressure, etc. Depending on the extent of the injections, a QA/QC program may also be desirable to identify the best methods and control injections. Those familiar with the art will be aware of procedures for injecting materials such as OC, and these are generally applicable for carbon injections, and involve Rupp pumps, mix tanks, and direct push rigs. Pneumatic or hydraulic injection or combinations thereof may also be used in some instances to achieve a dispersed placement.

Injection Loading. Generally, a water carbon slurry may be injected at a minimum rate of between approximately 2.5 to approximately 10 ft/sec, to maintain suspension of the activated carbon although higher velocities may be used. Velocities over ten feet per second (10 ft/sec.) may cause carbon abrasion and pipe erosion when pumping granules, although this is probably a negligible concern. The slurry can be transferred using positive displacement, centrifugal pumps, or diaphragm pumps. The pump selection will vary depending on necessary injection pressures and various other concerns, but generally a piston type positive displacement Rupp type of pump is often suitable for injections. The carbon to water ratio achievable for continuous dissolving of activated carbon will generally range up to approximately a ten percent (10%) to approximately fifteen percent (15%) solution, although an approximately twenty-five percent (25%) solution may be achieved. It should be noted that these levels of carbon in the slurry may be more than needed depending on the design, for example a 0.1% to 1% carbon by weight slurry may be adequate for treatment of an aquifer with benzene. The sorbent material may be contacted with the carrier prior to injection. In some instances, contacting between the activated carbon and the carrier will take place for a period of 24-hours to facilitate the de-airing process, and biological manipulations. An eductor may be used to draw the AC or sorbent material into the carrier. The slurry may then be injected (i.e., an education configuration shown and described supra with respect to FIG. 3a) or mixed further (i.e., a mixing configuration as shown and described supra with respect to FIG. 3b) and injected into the subsurface. Flushing with water or air may be conducted following the injection to clear well screens etc., and ensure suitable dispersion of the sorbent material and amendments throughout the targeted aquifer.

Injection Pressure. Generally, injection pressures will range from approximately ten pounds per square inch (10 psi) up to approximately one thousand pounds per square inch (1,000 psi). Higher pressures may be needed in tighter formations such as clays and silts and at greater depths, and for different injection methods, and lower pressures may be seen in loser and shallower sand and gravel formations. It should be noted too that a sand and gravel formation with a percentage of clay may require pressures as high as those used in clay soils. Pressure will also need to be maintained to overcome head losses in the injection equipment piping and hose. Hydrostatic head, soil overburden, and soil strength will also affect the pressure required. In some more permeable formations (high hydraulic conductivity such as gravel) if a powder is used with water as a carrier it may be possible to allow the carbon slurry to infiltrate under lower pressure over time. Alternatively, it is considered that lower injection flow rates and moderate to high pressure may sometimes distribute the sorbent material in a more evenly dispersed fashion, and may therefore sometimes be preferred. This approach can be effective for injecting through wells. And again, in some cases air or nitrogen may be beneficial in distributing the material. As always, depending on site conditions, design objectives, etc., different methods or approaches may prove effective, and in no way is discussion on these methods meant to be limiting.

Injection Pattern and Radius of influence. The radius of influence for the injections will vary (even in the same injection point) depending on a number of conditions including but not limited to properties of the formation, depth of the injection, injection pressure, and material particle size. Injection will generally proceed from the bottom up, to avoid forcing the contaminants below the extent of their already existing limits in the contamination site, and form overlapping rough cylinders of sorbent material in the targeted areas, though "bottom up" injection may not be necessary.

FIG. 4a shows a side view of one embodiment of rod assembly 400 used to introduce a slurry into a contaminated site, and FIG. 4b shows a close up side view of one embodiment of nozzle 420 for introducing the slurry in a dispersed fashion into ground 430 of a contaminated site. If the slurry is introduced only while rod assembly 400 is at its lowermost point, radius of influence 412 (i.e., the extent of the soil in which the slurry is introduced) is formed. Referring to FIGS. 4a and 4b collectively, in one embodiment of the method according to the instant invention, hollow pipe 410 with injection nozzle 420 on the end is pushed into injection point 112 within ground 430 and injections of the slurry into the site occur through pipe 410 and nozzle 420 as it is advanced into ground 430, creating a rough cylinder of influence 413 (as shown in FIG. 4a). In an alternate embodiment, pipe 410 and nozzle 420 are advanced into injection point 112 within ground 430 to a depth slightly beyond the extent of the contamination plume (not shown) and then the slurry is introduced as rod assembly 400 is extracted from injection point 112. This alternate method prevents the spread of contamination to a lower depth due to the pressure exerted by the introduced slurry, and also results in roughly creating cylinder of influence 413 (as shown in FIG. 4a).

Referring specifically to FIG. 4b, nozzle 420 is constructed of alloy steel AISI 6150, or other alloy steels with sufficiently high yield and tensile strength, but could alternately be constructed of carbon steel, stainless steel or any other sufficiently durable, ductile, and/or corrosion resistant material commonly used in the art, including combinations thereof, and pipe 410 can be made of the same materials. In the embodiment shown, pipe 410 and nozzle 420 are threadily engaged, sometimes with a viton o-ring between them, but could be temporarily connected by any means known in the art, permanently connected by any available means, or fashioned as one integral piece.

Also visible in FIG. 4b are a series of apertures 425 disposed on nozzle 420. As the slurry is pushed into rod assembly 400, the slurry is forced out of rod assembly 400 via apertures 425. One of ordinary skill in the art should appreciate that the shape, number, and dimensions of apertures 425 can vary depending on the physical characteristics of the slurry, the characteristics of ground 430, the temperature of the environment, the desired dispersal pattern, and the extent of the contamination. The nozzle may alternately be slotted like a well screen and be three (3) inches to two (2) feet long or other lengths, but often is one (1) feet long. This embodiment may be preferred for gas injection, but may also be used for liquid injection. Likewise rods with various diameters may be used for injection. One and one-quarter (1¼) inch, one and one-half (1½) inch, and two and one-quarter (1¼) inch diameter rods are standard. However, in the embodiment shown, nozzle 420 has an inner diameter of five eighths inch (⅝"), an outer diameter of one and one-half inches (1½"), a height of three and one-half inches (3.5"), and six (6) apertures 425, each three-eighths (⅜") of an inch long and one-eighth of an inch (⅛") wide.

Within the cylinders, the sorbent material will be distributed in a dispersed fashion within the formation. It may be beneficial to complete injections at the plume edge first and then progressively move injections inward. Based on experience, the radius of influence (ROI) will vary, and may range from about two feet (2') to about twenty feet (20'). For example, in sandy soils the ROI may be five to twenty feet (5' to 20'), while in silty sand and clay soils the ROI may be two to ten feet (2' to 10'). Those familiar with the art will also recognize that due to the typically heterogeneous nature of the subsurface, the injection ROI will vary, often within the same injection point. Increasing the injection pressure and flow rate will tend to increase the radius of influence, however some balance and tradeoff is necessary as higher flows and pressures may not disperse the sorption materials as evenly throughout the injection zone. Also, a thicker more viscous slurry will not penetrate the formation as readily. Thus, it is good to test and identify optimal injection pressures, flow rates, radius of influence, and slurry mixes (viscosity etc.) to ensure the formation will accept the slurry, and monitor them during injection. Variable volume pumps may also be helpful, allowing for the adjustment and fine tuning of the amount of slurry injected.

Placement and Volume of Sorbent Material Injected. In one embodiment of the invention, the method includes placing the injected sorbent material in the contaminated media such as native aquifer materials in a dispersed fashion. Generally, the sorbent material may range up to the entire void space, but from a practical and cost standpoint, placement of activated carbon may be limited to approximately five percent (5%) to approximately ten percent (10%) of the pore space of the formation soil at the high end, and significantly less one hundredth of one percent (0.01%) may be placed and still be effective. Although at that low level, and again, from a cost and practicality standpoint, sometimes more material will be placed. The active material may be placed such that the permeability of the aquifer in the treated area decreases or not, depending on the application and site conditions.

The progress of the injections, including injection pressures and volumes, should be monitored to avoid swelling of soils such that might impact nearby structures or paved surfaces. Assuming an area of approximately one hundred feet by fifty feet (100 ft×50 ft) requires treatment over a depth of 15 feet. Assuming further a porosity of 0.3 for the formation, filled pore space of five percent (5%), and an injection with a ROI of five feet (5'), fifty (50) injections of using 424 pounds of activated carbon each would be advanced. This equates to about 21,200 pounds of carbon, capable of attenuating approximately 1050 to approximately 2,100 pounds of benzene, and making the benzene more readily available to microbes for biological degradation.

Other Considerations. Consideration should also be given to fluctuations in the groundwater surface, and placement of the material above the high groundwater surface may be beneficial in ensuring the entire water column in an aquifer is treated, and may also facilitate treatment of smear zone contamination. This will also cover possible unknowns in the design such as groundwater surface fluctuations to a higher level than anticipated. Placement design may also involve placing more activated carbon in some areas (or "zones"), with the amount of activated carbon placed varying both vertically and horizontally throughout the formation. One of the advantages of the method of the instant application is an ability to do so, thus maximizing the effectiveness and utilizing the material in a most efficient manner. This may make some sense to the designer as contaminant levels vary, and in conjunction with tighter and looser zones in the formation, it is determined that such variation in emplacement is beneficial.

It is also noted that in practicing the method according to the instant application and injecting materials such as activated carbon, the material injects more readily in more permeable portions of the formation and less readily in less permeable portions of the formation, sometimes in the same injection point. It may be desirable for the designer to fortuitously allow this dynamic to occur as more material in the more permeable zones may, in some cases, place more treatment (sorbent material) where it is needed most, in locations where contamination can migrate most readily, and in some cases where contaminants can be treated most readily. However, it is not the intention here to direct the designer to pursue this treatment path out of hand, as material should be emplaced to the degree necessary for successful treatment in all zones requiring treatment. Should such variability in emplacement occur, in some instances it may be a helpful manifestation resulting during the injection.

Following typical practice at contaminated sites, those familiar with the art will recognize that practice of this invention requires an understanding of a number of different conditions at the site where the invention is to be applied. It is generally suggested that standard practices may be followed, and due to the variability of conditions, contaminants, cleanup target and objectives from site to site no one approach will work for all sites, rather a general approach may be followed.

Typically, a site is evaluated for monitored natural attenuation, and fluctuations in the groundwater elevations and contaminant levels. To this end, soil, and groundwater samples are collected to help identify site geologic and hydrogeologic conditions, determine the type of contaminants in the groundwater, and determine the distribution of the contaminants in the subsurface. This is typically accomplished by advancing borings, installing monitoring wells, and collecting soil and groundwater samples. In addition, information regarding other site conditions that may be relevant to possible remediation options are also obtained, including but not limited to parameters or samples that clarify site microbiology, the applicability of physical-biological and chemical treatment, site geochemistry, water chemistry, geotechnical engineering properties, and properties affecting engineering of fluid (defined broadly to include liquids, gasses, slurries of liquids and solids, liquids and gasses, aerosols, and liquids and gasses and solids) delivery systems. Although for the various treatment schemes presented above, different information may need to be obtained and additional conditions may need to be evaluated.

Generally contaminants degrade (if degradable) most readily under one of the conditions provided supra. Therefore, identifying the conditions under which a contaminant degrades most readily, and creating and maintaining those same conditions, will result in the most effective biological treatment process for removal of a targeted contaminant.

In evaluating contaminants for biological treatment in aerobic systems, parameters such as biochemical oxygen demand (BOD), chemical oxygen demand (COD), and total organic carbons (TOC) can provide valuable insights into the biodegradability of a contaminated water. If the ratio of BOD/COD is greater than approximately 0.6, contaminants can typically be degraded fairly easily. However, a BOD/COD ration equal to approximately 0.2 cannot be decomposed easily. The formula for a given contaminant may be used to compute total organic carbon (TOC—must remove $CO_2$, $HCO_3$, etc. prior to test). TOC or contaminant oxidation/reduction stoichiometric equations may be used to predict the theoretical demand for an electron acceptor exerted by a specific contaminant load, which will allow the designer to determine whether enough electron acceptor(s) are available at the site to degrade the contaminants present or whether additional electron acceptors need to be introduced.

Biological processes are subject to inhibition if the concentration of contaminants is too high. Thus, the designer should evaluate the potential for toxicity of the contaminants to the microorganisms. Also the designer should note that synergistic effects of a mixture of contaminants may make the mixture more toxic than one contaminant alone. Ultimately, while activated carbon will help minimize the toxic effects of the contaminants, it needs to be recognized that some levels of contamination will be too high to treat biologically. While values are available in the literature, toxic conditions are best evaluated during testing, as site specific conditions including microbial populations etc. are highly variable. Other site conditions may not be suitable for biological treatment of contaminants such as pH, which should optimally range between approximately 5.0 and approximately 9.0, and preferably be somewhat neutral.

Conceptual Site Model. Current practice typically summarizes the understanding of the wide range of variable conditions at the contaminated site in a conceptual site model. It should be noted that due to the complexity of the subsurface, the models may not be perfectly accurate, but, as those familiar with the art will know, are intended to represent to the best reasonable ability of professionals an interpretation of conditions at the site in general and in the subsurface. The remediation designer will generally incorporate into this model important understandings of the site history, including a contaminant release scenario (if possible, where, when, how much, and the type of contaminants released is determined). The model usually presents interpretations of site geology and hydrogeology. The model incorporates estimates of the type, distribution (vertically and horizontally) and quantity of contaminants at the site, typically integrated with geologic and hydrogeologic conditions to help present the best overall picture of contamination at the site, contaminant velocity, receptors, and potential impacts to the environment and human health.

Remedial Design. For the purposes of discussion, activated carbon will be used as a representative example of the sorbent material. In this embodiment of the method according to the instant application, activated carbon is injected into an aquifer as an attenuation media and placed within the context of natural attenuation processes at a contaminated site. The activated carbon attracts and concentrates contaminants from the site groundwater and soil within and on the activated carbon and in so doing significantly slows the velocity of the contaminant in the aquifer. The contaminant migrates so slowly that naturally occurring attenuation processes are able to degrade, treat, and otherwise attenuate the contaminant(s). Microbes, either naturally-occurring or intentionally amended to the activated carbon, also grow on the carbon and degrade the contaminants, resulting in site remediation.

Using activated carbon to enhance the adsorption reaction in aquifers can also significantly slow the migration of organic contaminants. Assuming a dry density for the soil of about one hundred ten pounds per cubic foot (110 lb/cf), and that ten percent (10%) of the aquifer pore space is filled with activated carbon, about 0.036 lb. (16,334 mg) of benzene would be adsorbed in one cubic foot (1 cf) of soil (or about 327 mg benzene/kg of soil), ignoring any sorption to the soil organic matter. A predicted Kd for the site incorporated herein by reference Karickhoff ("Sorption of Hydrophobic Pollutants on Natural Sediments," Water Research, Vol. 13, 1979) and Piwoni et al. ("Sorption of Volatile Organic Solvents from Aquifer Solution onto Subsurface Solids," Journal of Contaminant Hydrogeology, Vol. 5. 1989), is:

(1) Kd=Koc foc, where
(2) log Koc=0.22+0.69 log Kow, and
(3) log Kow (benzene)=2.13.

Therefore, log Koc=1.69, and Koc=49. Foc is about 0.0012 (0.12% by wt) assumed for a sand (used 0.001 in report), and Kd=49×0.0012=0.06 (for soils at the site).

(4) Kd=Cs (mg/Kg)/Cl (mg/L), Cl=3.6 mg/L last sample September 1994 MW-3), Cs (mg/Kg)=Kd×Cl=0.06× 3.6=0.216 mg benzene/kg soil, or about 10.8 mg benzene/cf soil phase, and converting 3.6 mg/L for one cubic foot (1 cf), soil porosity=0.3, about 30.5 mg benzene in water phase.

The higher a contaminant's octanol water partitioning coefficient (Koc) the more readily it will be attracted to the sorbent material. The Koc may also be used in conjunction with the fraction of organic carbon (foc) to predict partitioning between the solid and liquid phase following the relations Kd=foc Koc, and Kd=Cs/Cl, and thereby predict the mass sorbed to the mixed soil/sorbent materials. However, in practice, this is only roughly accurate and actual Kds should be found based on testing under site conditions. Many contaminants may be either sorbed and/or biochemically degraded, thus this process is widely applicable.

Jar tests indicated about 3.24 mg benzene/g carbon (3240 mg benzene/kg carbon), assuming amend soil with carbon at ten percent (10%) of pore volume of soil, will have 1,055 mg benzene/cf soil, and 4.36 mg benzene/kg soil. Effluent concentration was 0.03 mg/L benzene. If we assume soil and water mass negligible relative to mass carbon may adsorb, and use Jar test effluent concentration of Cs=0.03 mg/L: Kd(carbon) amended soil=Cs/Cl=4.36/0.03=145. Incorporated herein by reference, Freeze and Cherry ("Groundwater," Prentice-Hall, Inc., Englewood Cliffs, N.J., 1979):

(5) $V/V_c = (1+4\ Kd)$ to $(1+10\ Kd)$, where V=groundwater velocity and Vc=contaminant velocity. $V_c = v/(1+4\ Kd)$ to $v/(1+10\ Kd)$, V (groundwater velocity at the site) was 0.76 ft/d and Vc without carbon=0.76 ft/d/(1+4×0.18) to 0.76 ft/d/(1+10×0.18). Vc without carbon is therefore between 0.44 ft/d and 0.27 ft/d; and Vc with carbon=0.76 ft/d/(1+4×145) to 0.76 ft/d(1+10×145). Vc with carbon is therefore between 0.0013 ft/d (feet per day) and 0.00052 ft/d, significantly less than without carbon.

A half life for benzene at the site was estimated at 407 days. Assuming first order decay:

(6) $C/C_o = e^{-\lambda t}$, where C=concentration (mg/L) at some time t, Co=initial concentration (mg/L), $\lambda$=decay rate constant, and t=time (days): $Ln(C/C_o) = -\lambda t$, $Ln(0.5)/407 = -\lambda$, and $\lambda = 1.7 \times 10e-3$.

The time it will take for natural processes to degrade the contaminant from 3.6 mg/L to the regulatory criteria of 0.005 mg/L is ln(0.005/3)/−1.7×10e−3=3,673 days. Contaminant travel time to the property boundary 300 feet away for the unamended and carbon amended aquifer is contaminant travel time unamended aquifer=300 ft×days/0.44 ft=681 days; and contaminant travel time carbon amended aquifer=300 ft×days/0.00052 ft=230,769 days (approximately 632 years). This is just a representative example, and is not meant to be limiting. Other carbon quantities, different sorbent materials, and designs may be effective. Obviously less activated carbon may be placed and still be effective, depending on site conditions and objectives, and modeling to include diffusion may sometimes be helpful.

Thus, the carbon amended aquifer has sufficient time to naturally attenuate the contaminant. Activated carbon is also cost-effective. A site three hundred feet (300') long by one hundred feet (100') wide and with a fifteen foot (15') saturated thickness would require about 261 injections having a radius of influence of approximately five feet (5'). If ten percent (10%) of the soil void volume is filled with carbon (20 lb/cf) and assuming the porosity (n)=0.3, about 707 pounds of activated carbon would be placed per injection, or about 184,521 total pounds. At a cost of $0.80/lb., the activated carbon cost would be about $147,621. For a compound such as benzene activated carbon will adsorb somewhere between approximately five percent (5%) and approximately ten percent (10%) by weight. Even Assuming only five percent (5%), 50 mg/g benzene by weight would be adsorbed on the carbon, or about 9,226 pounds of benzene may be adsorbed. This takes into account that other organics as activated carbon will hold up to fifteen percent (15%) by weight organics. In addition, microbes will tend to grow and degrade the benzene on the carbon, creating something of a perpetual treatment process, as degraded benzene will no longer occupy sites on the carbon, and additional benzene may be adsorbed. Amendments can be added as necessary to enhance naturally occurring processes, and less carbon may clearly be used or carbon-loading can be varied across a site.

Testing. Due to the complexity of site water and geochemistry, testing is required to select the most desirable activated carbon (or other material) by determining both its sorption capacity and the break-through time for the activated carbon and soil mixture for the site. Testing typically includes both jar and column tests. Bench scale tests, that include jar and column tests, are recommended and are used to assess the applicability of a specific activated carbon in a specific instance.

Jar tests involve mixing a slurry of contaminated site soil, groundwater, and sorbent material together in jars to develop equilibrium partitioning coefficients (Kd) for site soils, groundwater, and the sorbent material. In general, water, soil, and powdered sorbent material will be placed in 300 mL BOD jars with five (5) concentrations of sorbent material. The jars are each mixed for about thirty (30) minutes and supernatant is drawn off and tested for contaminant levels. The effluent contaminant levels are subtracted from the influent contaminant levels to identify the amount of contaminant adsorbed, and the partitioning coefficients, Kd, are developed following:

(7) $X/M = Kd\ Ce^{1/n}$, where X is the amount of contaminant adsorbed in mg/g; M is the weight of activated carbon added in grams (g), Kd is the equilibrium partitioning coefficient, and C is the amount of contaminant remaining in solution in mg/L.

The data points are then plotted on a log-log plot in which 1/n represents the slope of the straight line isotherm herein referenced by the American Water Works Association (AWWA) publications Powdered Activated Carbon (B600-05), and Granular Activated Carbon (B604-05), and ASTM Determination of Absoptive Capacity of Activated Carbon by Aqueous Phase Isotherm Technique (1998; R2003). The Kd(s) developed is/are then incorporated into relations (1) through (5) supra to estimate contaminant velocities at the site. Site data is then incorporated into relation (6) above to determine the site decay rate constant ($\lambda$), and the naturally-occurring decay rate is used to estimate the treatment time required to achieve the treatment goals. The amount of carbon to be used to amend the aquifer is estimated by comparing the time required to achieve the treatment goals and the travel time of the concentration of interest. Sorption capacity may also be considered in the design. Note that this may be varied around the site by using Kd and the different amounts of carbon required to treat different contaminant levels.

Biological Testing. Should biological enhancement be an objective of the remedial design, respirometry testing may be desirable, and may, for example, help to identify the threshold of toxic conditions for microbes, the effectiveness of various microbial stimulations, the most effective carbon quantities, and/or substances not being present at the site limit biological activity. Likewise, testing to identify the activity and presence or absence of microbes that may degrade the contamination is important in practicing the invention. Full scale pilot testing to confirm performance under actual site conditions is also often helpful.

The stoichiometric equations for biochemical treatment of the contaminant(s) may be used by the designer to predict nutrient, electron acceptor/donor, and other requirements for maintaining acceptable microbial conditions. However, microbial and water chemistry conditions of the amended aquifer may be too complex to precisely predict from simple equations, and consistent with the current art, microcosms representative of a range of conditions anticipated or desirable to consider for the site may be tested in a respirometer or like device to identify potential performance of the overall treatment approach. These tests may overestimate the effectiveness of such a system due to the more ideal conditions created therein, and so a full scale pilot testing consisting of the actual treatment process to be implemented under actual site conditions should be considered by the designer, including the specific injection process to be used.

Degradation pathways of the target contaminants should also be evaluated to determine if objectionable byproducts may be generated during biochemical treatment, and to identify whether staged treatment is necessary to achieve complete degradation. Other issues may also arise, such as objectionable odors that may be generated by the reduction of $SO_4$ and HS by microorganisms growing on the carbon on biodegradable organic matter. One remedy would be to inject air, possibly periodically. In some cases, staged treatment using nitrification may also be considered.

While the method for treating a contaminated site has been shown and described with respect to several embodiments in accordance with the present invention, it is to be understood that the same is not limited thereto, but is susceptible to numerous changes and modifications as known to a person skilled in the art, and it is intended that the present invention not be limited to the details shown and described herein, but rather cover all such changes and modifications obvious to one of ordinary skill in the art.

What is claimed is:

1. A method of amending an aquifer comprising the steps of:
   mixing a sorbent material with a carrier to form a slurry, said sorbent material having one dimension of at least 1 micron; and
   introducing said slurry below the fracture pressure of said aquifer into said aquifer in a dispersed fashion within a pore space of said aquifer to permanently place said sorption material and promote permanent attenuation of contaminants in said aquifer, wherein an average said pore space of said aquifer is between approximately 3 and approximately 10 times a maximum particle size of said sorbent material, whereby said pore spaces of said aquifer are relatively undisturbed and said particle of said sorbent material is placed in a plurality of said pore spaces within the treated portion of said aquifer.

2. The method of claim 1, wherein said method further includes a step of testing said aquifer to determine one or more characteristics of said aquifer, said one or more characteristics selected from a group comprised aquifer formation hydrogeologic properties, groundwater surface and variability thereof, groundwater gradient, groundwater flow rate, groundwater velocity, soil permeability, aquifer hydraulic conductivity, total soil porosity, effective soil porosity, geologic characteristics, soil stratigraphy, soil lithology, aquifer injection properties, soil grain size distribution, soil average void size, slurry bleed off rate, groundwater characteristics, soil characteristics, water quality characteristics, water total organic carbon, water pH, water hardness, water dissolved solids, dissolved water iron levels, total water iron levels, soil characteristics, soil grain size distribution, soil type, soil total organic carbon, soil cation exchange capacity, contaminant quantity, contaminant extent, contaminant properties, and combinations thereof.

3. The method of claim 2, wherein said method further includes a step of selecting said sorbent material based on said one or more characteristics of said aquifer, one or more said characteristics of said soil, one or more said characteristics of said groundwater, and one or more characteristics of said at least one contaminant within said aquifer.

4. The method of claim 1, wherein said method further includes a step of advancing at least one injection point into said aquifer, said advancing performed by a technique selected from a group comprised of at least one push rod, at said at least one injection point, a sorbent material sweep, an injection through a well, a French drain type system, deep tilling, an hydraulic injection, a multi-phase inert gas injection, an aerosol injection, a water injection, at least one pump, at least one blower, at least one compressor, tank, at least one tank of compressed gas, at least one compressed gas tank after a blower or compressor, a geoprobe rig, at least one hand-held injection rod, and combinations thereof.

5. The method of claim 1, wherein said method relies on at least one microbe to amend said aquifer, said at least one microbe selected from a group comprised of naturally-occurring bacteria, non-native bacteria, and combinations thereof.

6. The method of claim 1, wherein said method includes a plurality of staged treatment zones, wherein each of said plurality of staged treatment zones varies a treatment scheme spatially, temporally, or spatially and temporally.

7. The method of claim 1, wherein said sorbent material is a coated timed release type to allow for staged treatment of said aquifer spatially, temporally, or spatially and temporally.

8. The method of claim 1, wherein said slurry is further comprised of at least one amendment, said amendment selected from a group comprised of a substrate, a co-substrate, molasses, food grade oil, guar gum, a gas, an aerosol, ozone, nitrogen, a nitrogen species, air, oxygen, hydrogen, a substance that releases hydrogen or oxygen, a material that causes said aquifer to release oxygen, ethanol, acetate, methane, an electron donor, an electron acceptor, a nutrient, a micronutrient, phosphate, ammonia, phosphoric acid, a buffer, a base, lime, an enzyme, a surfactant, a microorganism, bacteria, yeast, a chemical oxidant, calcium hypochlorite, hydrogen peroxide, slow release peroxide, potassium permanganate, a Fentons reagent, a modified Fentons reagent, a nitrate at least one mineral, diatomaceous earth, a coagulant, a polymenr, a polyelectrolyte, and combinations thereof such that said additional material acts in concert with said sorbent material to enhance treatment of said contaminant in said aquifer.

9. The method of claim 8, wherein said amendment further includes at least one coating, wherein said at least one coating is selected from a group comprised of a microencapsulation, a nanoencapsulations, a timed release coating, a controlled release coating, at least one surfactant, at least one natural polymer, a protein, a vegetable gum, a natural mineral, sulfur, a wax, a synthetic polymer, a sugar, and combinations thereof.

10. The method of claim 1, wherein said method further includes a step of introducing an amendment at a different time than said introducing said slurry step, said amendment selected from a group comprised of a substrate, a co-substrate, molasses, food grade oil, guar gum, a gas, an aerosol, ozone, nitrogen, a nitrogen species, air, oxygen, hydrogen, a substance that releases hydrogen or oxygen, a material that causes said aquifer to release oxygen, ethanol, acetate, methane, an electron donor, an electron acceptor, a nutrient, a micronutrient, phosphate, ammonia, phosphoric acid, a buffer, a base, lime, an enzyme, a surfactant, a microorganism, bacteria, yeast, a chemical oxidant, calcium hypochlorite, hydrogen peroxide, slow release peroxide, potassium permanganate, a Fentons reagent, a modified Fentons reagent, a nitrate, at least one mineral, diatomaceous earth, a coagulant, a polymenr, a polyelectrolyte, and combinations thereof such that said additional material acts in concert with said sorbent material to enhance treatment of said contaminant in said aquifer.

11. The method of claim 1, wherein said introducing step is performed at a pressure between approximately 10 psi and approximately 1,000 psi.

12. The method of claim 1, wherein said carrier is selected from a group comprised of a liquid carrier, a gas carrier, and combinations thereof, said liquid carrier selected from a group comprised of water, liquids, guar gum, food grade oil, hydrogen release compounds, oxygen release compounds, chemical oxidants, surfactants, coagulants, polymers, polyelectrolytes, and combinations thereof, and said gas carrier selected from a group comprised of air, nitrogen, oxygen, hydrogen, gases, aerosols, chemical oxidants, ozone, and combinations thereof.

13. The method of claim 12, wherein said gas carrier is greater than or equal to approximately twenty five thousandths of one percent by volume said sorbent material.

14. The method of claim 12, wherein said liquid carrier is introduced using an eduction configuration and is less than or equal to approximately 20 percent by weight of said sorbent material.

15. The method of claim 12, wherein said liquid carrier is introduced using a mixing configuration and is less than or equal to approximately 40 percent by weight of said sorbent material.

16. The method of claim 1, wherein said sorbent material is selected from a group comprised of activated carbon, acid washed activated carbon, composite particles made of activated carbon combined with one or more other materials, at least one polymeric substance, peat, calcium alginate, activated alumina, humate, clay, a biosolid, a surfactant modified silicate, a resin, a polymeric substance, and combinations thereof.

17. The method of claim 1, wherein said method includes the step of matching a grain size of said sorbent material with a pore size of said aquifer.

18. The method of claim 17, wherein said sorbent material has a maximum particle size that is a less than an approximate average pore size of said aquifer.

19. The method of claim 1, wherein said sorbent material has a dry bulk density less than or equal to approximately 50 pounds per cubic foot.

20. The method of claim 1, wherein said method results in at least approximately 0.01 percent of a void space by volume within a treated portion of said aquifer being filled with said sorbent material.

21. The method of claim 1, wherein said sorbent material has a surface area of at least approximately 50 square meters per gram.

22. A method of amending a contaminated medium comprising the steps of:
advancing at least one injection point into said contaminated medium;
selecting a sorbent material, said sorbent material having a grain size matched to an average pore space of said contaminated medium and having one dimension of at least 1 micron and a average pore size of said contaminated medium is between approximately 3 and approximately 10 times a maximum particle size of said sorbent material;
mixing said sorbent material with a carrier to form a slurry; and
introducing said slurry into said contaminated medium in a dispersed fashion within said pore space of said contaminated medium to promote permanent attenuation of at least one contaminant in said contaminated medium, wherein said method results in at least approximately 0.01 percent of a void space by volume within a treated portion of said contaminated medium being filled with said sorbent material, whereby said contaminated medium is relatively undisturbed when said introducing said slurry into said pore spaces of said contaminated medium and said particle of said sorbent material is placed within a plurality of said pore spaces of said contaminated medium.

23. The method of claim 22, wherein said method further includes a step of testing said contaminated medium to determine one or more characteristics of said contaminated medium, said one or more characteristics selected from a group comprised aquifer formation hydrogeologic properties, groundwater surface and variability thereof, groundwater gradient, groundwater flow rate, groundwater velocity, soil permeability, aquifer hydraulic conductivity, total soil porosity, effective soil porosity, geologic characteristics, soil stratigraphy, soil lithology, contaminated medium injection properties, soil grain size distribution, soil average void size, slurry bleed off rate, groundwater characteristics, soil characteristics, water quality characteristics, water total organic carbon, water pH, water hardness, water dissolved solids, dissolved water iron levels, total water iron levels, soil characteristics, soil grain size distribution, soil type, soil total organic carbon, soil cation exchange capacity, contaminant quantity, contaminant extent, contaminant properties, and combinations thereof.

24. The method of claim 22, wherein said advancing step is performed by a technique selected from a group comprised of at least one push rod, at said at least one injection point, a sorbent material sweep, an injection through a well, a French drain type system, deep tilling, an hydraulic injection, a multi-phase inert gas injection, an aerosol injection, a water injection, at least one pump, at least one blower, at least one compressor, tank, at least one tank of compressed gas, at least one compressed gas tank after a blower or compressor, a geoprobe rig, at least one hand-held injection rod, and combinations thereof.

25. The method of claim 22, wherein said method relies on at least one microbe to amend said contaminated medium, said at least one microbe selected from a group comprised of naturally-occurring bacteria, non-native bacteria, and combinations thereof.

26. The method of claim 22, wherein said method includes a plurality of staged treatment zones, wherein each of said plurality of staged treatment zones varies a treatment scheme spatially, temporally, or spatially and temporally.

27. The method of claim 22, wherein said sorbent material is a coated timed release type to allow for staged treatment of said aquifer spatially, temporally, or spatially and temporally.

28. The method of claim 22, wherein said slurry is further comprised of at least one amendment, said amendment selected from a group comprised of a substrate, a co-substrate, molasses, food grade oil, guar gum, a gas, an aerosol, ozone, nitrogen, a nitrogen species, air, oxygen, hydrogen, a substance that releases hydrogen or oxygen, a material that causes said contaminated medium to release oxygen, ethanol, acetate, methane, an electron donor, an electron acceptor, a nutrient, a micronutrient, phosphate, ammonia, phosphoric acid, a buffer, a base, lime, an enzyme, a surfactant, a microorganism, bacteria, yeast, a chemical oxidant, calcium hypochlorite, hydrogen peroxide, slow release peroxide, potassium permanganate, a Fentons reagent, a modified Fentons reagent, a nitrate, at least one mineral, diatomaceous earth, a coagulant, a polymenr, a polyelectrolyte, and combinations thereof such that said additional material acts in concert with said sorbent material to enhance treatment of said at least one contaminant in said contaminated medium.

29. The method of claim 28, wherein said amendment further includes at least one coating, wherein said at least one coating is selected from a group comprised of a microencapsulation, a nanoencapsulations, a timed release coating, a controlled release coating, at least one surfactant, at least one natural polymer, a protein, a vegetable gum, a natural mineral, sulfur, a wax, a synthetic polymer, and combinations thereof.

30. The method of claim 22, wherein said method further includes a step of introducing an amendment at a different time than said introducing said slurry step, said amendment selected from a group comprised of a substrate, a co-substrate, molasses, food grade oil, guar gum, a gas, an aerosol, ozone, nitrogen, a nitrogen species, air, oxygen, hydrogen, a substance that releases hydrogen or oxygen, a material that causes said contaminated medium to release oxygen, ethanol, acetate, methane, an electron donor, an electron acceptor, a nutrient, a micronutrient, phosphate, ammonia, phosphoric acid, a buffer, a base, lime, an enzyme, a surfactant, a microorganism, bacteria, yeast, a chemical oxidant, calcium hypochlorite, hydrogen peroxide, slow release peroxide, potassium permanganate, a Fentons reagent, a modified Fentons reagent, a nitrate, at least one mineral, diatomaceous earth, a coagulant, a polymenr, a polyelectrolyte, and combinations thereof such that said additional material acts in concert with said sorbent material to enhance treatment of said at least one contaminant in said contaminated medium.

31. The method of claim 22, wherein said introducing step is performed at a pressure between approximately 10 psi and approximately 1,000 psi.

32. The method of claim 22, wherein said carrier is selected from a group comprised of a liquid carrier, a gas carrier, and combinations thereof, said liquid carrier selected from a group comprised of water, guar gum, food grade oil, hydrogen release compounds, oxygen release compounds, chemical oxidants, surfactants, coagulants, polymers, polyelectrolytes, and combinations thereof, and said gas carrier selected from a group comprised of air, nitrogen, oxygen, hydrogen, gases, aerosols, chemical oxidants, ozone, and combinations thereof.

33. The method of claim 32, wherein said gas carrier is greater than or equal to approximately twenty five thousandths of one percent by volume said sorbent material.

34. The method of claim 32, wherein said liquid carrier is introduced using an eduction configuration and is less than or equal to approximately 20 percent by weight of said sorbent material.

35. The method of claim 32, wherein said liquid carrier is introduced using a mixing configuration and is less than or equal to approximately 40 percent by weight of said sorbent material.

36. The method of claim 22, wherein said sorbent material is selected from a group comprised of activated carbon, acid washed activated carbon, of activated carbon combined with one or more other materials, at least one polymeric substance, peat, calcium alginate, humate, a biosolid, a polymeric substance, and combinations thereof.

37. The method of claim 22, wherein said sorbent material is matched to said average pore space of said contaminated medium by having a maximum particle size that is less than an approximate average pore size of said contaminated medium.

38. The method of claim 22, wherein said sorbent material has a dry bulk density less than or equal to approximately 120 50 pounds per cubic foot.

39. The method of claim 22, wherein said sorbent material has a surface area of at least approximately 50 square meters per gram.

40. A method of amending a contaminated medium comprising the steps of:
    advancing at least one injection point into said contaminated medium;
    selecting a sorbent material, said sorbent material having a dry bulk density of less than approximately 120 50 pounds per cubic foot and a maximum particle size of said sorbent material is $\frac{1}{3}$ to $\frac{1}{100}$ of an average pore space of said contaminated medium;
    mixing said sorbent material with a carrier to form a slurry; and
    introducing said slurry into said contaminated medium in a dispersed fashion within a pore space of said contaminated medium to promote sorption of at least one contaminant in said contaminated medium, whereby said particle of said sorbent material is placed in a plurality of relatively undisturbed said pore spaces in the treated portion of said contaminated medium.

41. A method of amending a contaminated medium comprising the steps of:
    selecting a sorbent material, said sorbent material having one dimension of at least 1 micron and a maximum particle size of said sorbent material is $\frac{1}{3}$ to $\frac{1}{100}$ of an average pore space of said contaminated medium;
    mixing said sorbent material with a carrier to form a slurry; and
    introducing said slurry into said contaminated medium in a dispersed fashion within pore space of said contaminated medium to promote sorption of at least one contaminant in said contaminated medium, wherein said method results in at least 0.01 percent of said pore space of said contaminated medium being filled with said sorbent material, whereby said pore space of said contaminated medium is relatively undisturbed during said introducing of said slurry into said contaminated medium and said particle of said sorbent material is placed in a plurality of said pore spaces in said contaminated medium.

42. A method of amending a contaminated medium comprising the steps of:
    selecting a sorbent material, said sorbent material having a surface area of at least approximately 50 square meters per gram and a maximum particle size of said sorbent material is $\frac{1}{3}$ to $\frac{1}{100}$ of an average pore space of said contaminated medium;
    mixing said sorbent material with a carrier to form a slurry; and
    introducing said slurry into said contaminated medium in a dispersed fashion within a pore space of said contaminated medium to promote sorption of at least one contaminant in said contaminated medium, whereby said pore space of said contaminated medium is relatively undisturbed during said introducing of said slurry and said particle of said sorbent material is placed within a plurality of said pore spaces in said contaminated medium.

43. A method of amending a contaminated medium comprising the steps of:
    selecting a activated carbon, said activated carbon having a maximum particle size that is $\frac{1}{3}$ to $\frac{1}{100}$ of an average pore space of said contaminated medium;
    mixing activated carbon with a carrier to form a slurry;
    introducing said slurry into said contaminated medium in a dispersed fashion within a pore space of said contaminated medium; and
    relying on sorption of at least one contaminant to said activated carbon and naturally occurring processes to attenuate said at least one contaminant to slow migration of said at least one contaminant in said contaminated medium and promote permanent attenuation of said at least one contaminant in said contaminated medium, whereby said pore space of said contaminated medium is relatively undisturbed during said introducing of said slurry and said particle of said activated carbon is placed within a plurality of said pore spaces in said contaminated medium.

44. A method of amending a medium contaminated with cyanide comprising the steps of:

selecting an activated carbon, said activated carbon having a maximum particle size of said activated carbon that is $\frac{1}{3}$ to $\frac{1}{100}$ of an average pore space of said contaminated medium;

mixing said activated carbon with a carrier to form a slurry;

providing an oxygen source, said oxygen source selected from a group comprised of air, pure oxygen, oxygen in the groundwater, releasing oxygen from the formation, ozone, hydrogen peroxide, slow release peroxide, and combinations thereof; and introducing said slurry and providing said oxygen source in a dispersed fashion within a pore space of said contaminated medium to promote treatment of said cyanide, whereby said pore space of said contaminated medium is relatively undisturbed during said introducing of said slurry and said particle of said activated carbon is placed within a plurality of said pore spaces in said contaminated medium.

45. A method of amending an aquifer having at least one contaminant comprising the steps of:

selecting a sorbent material, said sorbent material having a maximum particle size of said sorbent material $\frac{1}{3}$ to $\frac{1}{100}$ of an average pore space of said contaminated medium;

mixing a sorbent material with a carrier to form a slurry, said sorbent material having one dimension of at least 1 micron;

introducing said slurry below the fracture pressure of said aquifer into said aquifer in a dispersed fashion within a pore space of said aquifer; and introducing ozone into said aquifer to promote sorption and degradation of contaminants in said aquifer, whereby said particle of said sorbent material is placed within a plurality of said pore spaces in said contaminated medium.

\* \* \* \* \*